(12) United States Patent
Brockmann et al.

(10) Patent No.: US 10,409,445 B2
(45) Date of Patent: Sep. 10, 2019

(54) RENDERING OF AN INTERACTIVE LEAN-BACKWARD USER INTERFACE ON A TELEVISION

(71) Applicant: ActiveVideo Networks, Inc., San Jose, CA (US)

(72) Inventors: Ronald Alexander Brockmann, Utrecht (NL); Jesse Song Yi Tan, Amsterdam (NL); Henderika Vogel, Utrecht (NL); Cornelis Meerveld, Amersfoort (NL)

(73) Assignee: ActiveVideo Networks, Inc., San Jose, CA (US)

( * ) Notice: Subject to any disclaimer, the term of this patent is extended or adjusted under 35 U.S.C. 154(b) by 339 days.

(21) Appl. No.: 13/737,097

(22) Filed: Jan. 9, 2013

(65) Prior Publication Data
US 2013/0179787 A1 Jul. 11, 2013

Related U.S. Application Data

(60) Provisional application No. 61/584,538, filed on Jan. 9, 2012.

(51) Int. Cl.
*H04N 21/25* (2011.01)
*G06F 3/0481* (2013.01)
(Continued)

(52) U.S. Cl.
CPC ..... *G06F 3/04815* (2013.01); *H04N 21/2183* (2013.01); *H04N 21/2343* (2013.01);
(Continued)

(58) Field of Classification Search
CPC ........... H04N 21/23106; H04N 21/472; H04N 21/27; H04N 21/2183; H04N 21/8153;
(Continued)

(56) References Cited

U.S. PATENT DOCUMENTS

| 3,889,050 A | 6/1975 | Thompson |
| 3,934,079 A | 1/1976 | Barnhart |

(Continued)

FOREIGN PATENT DOCUMENTS

| AT | 191599 T | 4/2000 |
| AT | 198969 T | 2/2001 |

(Continued)

OTHER PUBLICATIONS

AC-3 digital audio compression standard, Extract, Dec. 20, 1995, 11 pgs.

(Continued)

*Primary Examiner* — Nicholas Klicos
(74) *Attorney, Agent, or Firm* — Morgan, Lewis & Bockius LLP

(57) ABSTRACT

Embodiments of the invention relate to user interfaces and systems and methods for generating a real-time "lean-back" user interface for use with a television or other display device and for reuse of encoded elements for forming a video frame of the user interface. An interactive session is established between a client device associated with a user's television and the platform for creating the user interface over a communication network, such as a cable television network. The user interface is automatically generated by the platform and is animated even without interactions by the user with an input device. The user interface includes a plurality of interactive animated assets. The animated assets are capable of changing over time (e.g. different images, full-motion video) and are also capable of being animated so as to change screen position, rotate, move etc. over time. A hash is maintained of cached encoded assets and cached elements that may be reused within a user session and between user sessions.

30 Claims, 5 Drawing Sheets

(51) Int. Cl.
*H04N 21/231* (2011.01)
*H04N 21/2343* (2011.01)
*H04N 21/258* (2011.01)
*H04N 21/431* (2011.01)
*H04N 21/482* (2011.01)
*H04N 21/6587* (2011.01)
*H04N 21/81* (2011.01)
*H04N 21/8545* (2011.01)
*H04N 21/2183* (2011.01)
*H04N 21/27* (2011.01)
*H04N 21/472* (2011.01)
*H04N 21/84* (2011.01)
*H04N 21/8549* (2011.01)

(52) U.S. Cl.
CPC ..... *H04N 21/23106* (2013.01); *H04N 21/251* (2013.01); *H04N 21/25891* (2013.01); *H04N 21/27* (2013.01); *H04N 21/4312* (2013.01); *H04N 21/472* (2013.01); *H04N 21/482* (2013.01); *H04N 21/6587* (2013.01); *H04N 21/8153* (2013.01); *H04N 21/8545* (2013.01); *H04N 21/84* (2013.01); *H04N 21/8549* (2013.01)

(58) Field of Classification Search
CPC ........... H04N 21/8545; H04N 21/2343; H04N 21/6587; H04N 21/251; H04N 21/4312; H04N 21/25891; H04N 21/482; H04N 21/8549; H04N 21/84; G06F 3/04815
See application file for complete search history.

(56) References Cited

U.S. PATENT DOCUMENTS

| | | |
|---|---|---|
| 3,997,718 A | 12/1976 | Ricketts et al. |
| 4,002,843 A | 1/1977 | Rackman |
| 4,032,972 A | 6/1977 | Saylor |
| 4,077,006 A | 2/1978 | Nicholson |
| 4,081,831 A | 3/1978 | Tang et al. |
| 4,107,734 A | 8/1978 | Percy et al. |
| 4,107,735 A | 8/1978 | Frohbach |
| 4,145,720 A | 3/1979 | Weintraub et al. |
| 4,168,400 A | 9/1979 | de Couasnon et al. |
| 4,186,438 A | 1/1980 | Benson et al. |
| 4,222,068 A | 9/1980 | Thompson |
| 4,245,245 A | 1/1981 | Matsumoto et al. |
| 4,247,106 A | 1/1981 | Jeffers et al. |
| 4,253,114 A | 2/1981 | Tang et al. |
| 4,264,924 A | 4/1981 | Freeman |
| 4,264,925 A | 4/1981 | Freeman et al. |
| 4,290,142 A | 9/1981 | Schnee et al. |
| 4,302,771 A | 11/1981 | Gargini |
| 4,308,554 A | 12/1981 | Percy et al. |
| 4,350,980 A | 9/1982 | Ward |
| 4,367,557 A | 1/1983 | Stern et al. |
| 4,395,780 A | 7/1983 | Gohm et al. |
| 4,408,225 A | 10/1983 | Ensinger et al. |
| 4,450,477 A | 5/1984 | Lovett |
| 4,454,538 A | 6/1984 | Toriumi |
| 4,466,017 A | 8/1984 | Banker |
| 4,471,380 A | 9/1984 | Mobley |
| 4,475,123 A | 10/1984 | Dumbauld et al. |
| 4,484,217 A | 11/1984 | Block et al. |
| 4,491,983 A | 1/1985 | Pinnow et al. |
| 4,506,387 A | 3/1985 | Walter |
| 4,507,680 A | 3/1985 | Freeman |
| 4,509,073 A | 4/1985 | Baran et al. |
| 4,523,228 A | 6/1985 | Banker |
| 4,533,948 A | 8/1985 | McNamara et al. |
| 4,536,791 A | 8/1985 | Campbell et al. |
| 4,538,174 A | 8/1985 | Gargini et al. |
| 4,538,176 A | 8/1985 | Nakajima et al. |
| 4,553,161 A | 11/1985 | Citta |
| 4,554,581 A | 11/1985 | Tentler et al. |
| 4,555,561 A | 11/1985 | Sugimori et al. |
| 4,562,465 A | 12/1985 | Glaab |
| 4,567,517 A | 1/1986 | Mobley |
| 4,573,072 A | 2/1986 | Freeman |
| 4,591,906 A | 5/1986 | Morales-Garza et al. |
| 4,602,279 A | 7/1986 | Freeman |
| 4,614,970 A | 9/1986 | Clupper et al. |
| 4,616,263 A | 10/1986 | Eichelberger |
| 4,625,235 A | 11/1986 | Watson |
| 4,627,105 A | 12/1986 | Ohashi et al. |
| 4,633,462 A | 12/1986 | Stifle et al. |
| 4,670,904 A | 6/1987 | Rumreich |
| 4,682,360 A | 7/1987 | Frederiksen |
| 4,695,880 A | 9/1987 | Johnson et al. |
| 4,706,121 A | 11/1987 | Young |
| 4,706,285 A | 11/1987 | Rumreich |
| 4,709,418 A | 11/1987 | Fox et al. |
| 4,710,971 A | 12/1987 | Nozaki et al. |
| 4,718,086 A | 1/1988 | Rumreich et al. |
| 4,732,764 A | 3/1988 | Hemingway et al. |
| 4,734,764 A | 3/1988 | Pocock et al. |
| 4,748,689 A | 5/1988 | Mohr |
| 4,749,992 A | 6/1988 | Fitzemeyer et al. |
| 4,750,036 A | 6/1988 | Martinez |
| 4,754,426 A | 6/1988 | Rast et al. |
| 4,760,442 A | 7/1988 | O'Connell et al. |
| 4,763,317 A | 8/1988 | Lehman et al. |
| 4,769,833 A | 9/1988 | Farleigh et al. |
| 4,769,838 A | 9/1988 | Hasegawa |
| 4,789,863 A | 12/1988 | Bush |
| 4,792,849 A | 12/1988 | McCalley et al. |
| 4,801,190 A | 1/1989 | Imoto |
| 4,805,134 A | 2/1989 | Calo et al. |
| 4,807,031 A | 2/1989 | Broughton et al. |
| 4,816,905 A | 3/1989 | Tweedy et al. |
| 4,821,102 A | 4/1989 | Ichikawa et al. |
| 4,823,386 A | 4/1989 | Dumbauld et al. |
| 4,827,253 A | 5/1989 | Maltz |
| 4,827,511 A | 5/1989 | Masuko |
| 4,829,372 A | 5/1989 | McCalley et al. |
| 4,829,558 A | 5/1989 | Welsh |
| 4,847,698 A | 7/1989 | Freeman |
| 4,847,699 A | 7/1989 | Freeman |
| 4,847,700 A | 7/1989 | Freeman |
| 4,848,698 A | 7/1989 | Newell et al. |
| 4,860,379 A | 8/1989 | Schoeneberger et al. |
| 4,864,613 A | 9/1989 | Van Cleave |
| 4,876,592 A | 10/1989 | Von Kohorn |
| 4,889,369 A | 12/1989 | Albrecht |
| 4,890,320 A | 12/1989 | Monslow et al. |
| 4,891,694 A | 1/1990 | Way |
| 4,901,367 A | 2/1990 | Nicholson |
| 4,903,126 A | 2/1990 | Kassatly |
| 4,905,094 A | 2/1990 | Pocock et al. |
| 4,912,760 A | 3/1990 | West, Jr. et al. |
| 4,918,516 A | 4/1990 | Freeman |
| 4,920,566 A | 4/1990 | Robbins et al. |
| 4,922,532 A | 5/1990 | Farmer et al. |
| 4,924,303 A | 5/1990 | Brandon et al. |
| 4,924,498 A | 5/1990 | Farmer et al. |
| 4,937,821 A | 6/1990 | Boulton |
| 4,941,040 A | 7/1990 | Pocock et al. |
| 4,947,244 A | 8/1990 | Fenwick et al. |
| 4,961,211 A | 10/1990 | Tsugane et al. |
| 4,963,995 A | 10/1990 | Lang |
| 4,975,771 A | 12/1990 | Kassatly |
| 4,989,245 A | 1/1991 | Bennett |
| 4,994,909 A | 2/1991 | Graves et al. |
| 4,995,078 A | 2/1991 | Monslow et al. |
| 5,003,384 A | 3/1991 | Durden et al. |
| 5,008,934 A | 4/1991 | Endoh |
| 5,014,125 A | 5/1991 | Pocock et al. |
| 5,027,400 A | 6/1991 | Baji et al. |
| 5,051,720 A | 9/1991 | Kittirutsunetorn |
| 5,051,822 A | 9/1991 | Rhoades |
| 5,057,917 A | 10/1991 | Shalkauser et al. |
| 5,058,160 A | 10/1991 | Banker et al. |

(56) References Cited

U.S. PATENT DOCUMENTS

| | | |
|---|---|---|
| 5,060,262 A | 10/1991 | Bevins, Jr. et al. |
| 5,077,607 A | 12/1991 | Johnson et al. |
| 5,083,800 A | 1/1992 | Lockton |
| 5,088,111 A | 2/1992 | McNamara et al. |
| 5,093,718 A | 3/1992 | Hoarty et al. |
| 5,109,414 A | 4/1992 | Harvey et al. |
| 5,113,496 A | 5/1992 | McCalley et al. |
| 5,119,188 A | 6/1992 | McCalley et al. |
| 5,130,792 A | 7/1992 | Tindell et al. |
| 5,132,992 A | 7/1992 | Yurt et al. |
| 5,133,009 A | 7/1992 | Rumreich |
| 5,133,079 A | 7/1992 | Ballantyne et al. |
| 5,136,411 A | 8/1992 | Paik et al. |
| 5,142,575 A | 8/1992 | Farmer et al. |
| 5,144,448 A | 9/1992 | Hornbaker, III et al. |
| 5,155,591 A | 10/1992 | Wachob |
| 5,172,413 A | 12/1992 | Bradley et al. |
| 5,191,410 A | 3/1993 | McCalley et al. |
| 5,195,092 A | 3/1993 | Wilson et al. |
| 5,208,665 A | 5/1993 | McCalley et al. |
| 5,220,420 A | 6/1993 | Hoarty et al. |
| 5,230,019 A | 7/1993 | Yanagimichi et al. |
| 5,231,494 A | 7/1993 | Wachob |
| 5,236,199 A | 8/1993 | Thompson, Jr. |
| 5,247,347 A | 9/1993 | Letteral et al. |
| 5,253,341 A | 10/1993 | Rozmanith et al. |
| 5,262,854 A | 11/1993 | Ng |
| 5,262,860 A | 11/1993 | Fitzpatrick et al. |
| 5,303,388 A | 4/1994 | Kreitman et al. |
| 5,319,455 A | 6/1994 | Hoarty et al. |
| 5,319,707 A | 6/1994 | Wasilewski et al. |
| 5,321,440 A | 6/1994 | Yanagihara et al. |
| 5,321,514 A | 6/1994 | Martinez |
| 5,351,129 A | 9/1994 | Lai |
| 5,355,162 A | 10/1994 | Yazolino et al. |
| 5,359,601 A | 10/1994 | Wasilewski et al. |
| 5,361,091 A | 11/1994 | Hoarty et al. |
| 5,371,532 A | 12/1994 | Gelman et al. |
| 5,404,393 A | 4/1995 | Remillard |
| 5,408,274 A | 4/1995 | Chang |
| 5,410,343 A | 4/1995 | Coddington et al. |
| 5,410,344 A | 4/1995 | Graves et al. |
| 5,412,415 A | 5/1995 | Cook et al. |
| 5,412,720 A | 5/1995 | Hoarty |
| 5,418,559 A | 5/1995 | Blahut |
| 5,422,674 A | 6/1995 | Hooper et al. |
| 5,422,887 A | 6/1995 | Diepstraten et al. |
| 5,442,389 A | 8/1995 | Blahut et al. |
| 5,442,390 A | 8/1995 | Hooper et al. |
| 5,442,700 A | 8/1995 | Snell et al. |
| 5,446,490 A | 8/1995 | Blahut et al. |
| 5,469,283 A | 11/1995 | Vinel et al. |
| 5,469,431 A | 11/1995 | Wendorf et al. |
| 5,471,263 A | 11/1995 | Odaka |
| 5,481,542 A | 1/1996 | Logston et al. |
| 5,485,197 A | 1/1996 | Hoarty |
| 5,487,066 A | 1/1996 | McNamara et al. |
| 5,493,638 A | 2/1996 | Hooper et al. |
| 5,495,283 A | 2/1996 | Cowe |
| 5,495,295 A | 2/1996 | Long |
| 5,497,187 A | 3/1996 | Banker et al. |
| 5,517,250 A | 5/1996 | Hoogenboom et al. |
| 5,526,034 A | 6/1996 | Hoarty et al. |
| 5,528,281 A | 6/1996 | Grady et al. |
| 5,537,397 A | 7/1996 | Abramson |
| 5,537,404 A | 7/1996 | Bentley et al. |
| 5,539,449 A | 7/1996 | Blahut et al. |
| RE35,314 E | 8/1996 | Logg |
| 5,548,340 A | 8/1996 | Bertram |
| 5,550,578 A | 8/1996 | Hoarty et al. |
| 5,557,316 A | 9/1996 | Hoarty et al. |
| 5,559,549 A | 9/1996 | Hendricks et al. |
| 5,561,708 A | 10/1996 | Remillard |
| 5,570,126 A | 10/1996 | Blahut et al. |
| 5,570,363 A | 10/1996 | Holm |
| 5,579,143 A | 11/1996 | Huber |
| 5,581,653 A | 12/1996 | Todd |
| 5,583,927 A | 12/1996 | Ely et al. |
| 5,587,734 A | 12/1996 | Lauder et al. |
| 5,589,885 A | 12/1996 | Ooi |
| 5,592,470 A | 1/1997 | Rudrapatna et al. |
| 5,594,507 A | 1/1997 | Hoarty |
| 5,594,723 A | 1/1997 | Tibi |
| 5,594,938 A | 1/1997 | Engel |
| 5,596,693 A | 1/1997 | Needle et al. |
| 5,600,364 A | 2/1997 | Hendricks et al. |
| 5,600,573 A | 2/1997 | Hendricks et al. |
| 5,608,446 A | 3/1997 | Carr et al. |
| 5,617,145 A | 4/1997 | Huang et al. |
| 5,621,464 A | 4/1997 | Teo et al. |
| 5,625,404 A | 4/1997 | Grady et al. |
| 5,630,757 A | 5/1997 | Gagin et al. |
| 5,631,693 A | 5/1997 | Wunderlich et al. |
| 5,631,846 A | 5/1997 | Szurkowski |
| 5,632,003 A | 5/1997 | Davidson et al. |
| 5,642,498 A | 6/1997 | Kutner |
| 5,649,283 A | 7/1997 | Galler et al. |
| 5,668,592 A | 9/1997 | Spaulding, II |
| 5,668,599 A | 9/1997 | Cheney et al. |
| 5,708,767 A | 1/1998 | Yeo et al. |
| 5,710,815 A | 1/1998 | Ming et al. |
| 5,712,906 A | 1/1998 | Grady et al. |
| 5,740,307 A | 4/1998 | Lane |
| 5,742,289 A | 4/1998 | Naylor et al. |
| 5,748,234 A | 5/1998 | Lippincott |
| 5,754,941 A | 5/1998 | Sharpe et al. |
| 5,786,527 A | 7/1998 | Tarte |
| 5,790,174 A | 8/1998 | Richard, III et al. |
| 5,802,283 A | 9/1998 | Grady et al. |
| 5,812,665 A | 9/1998 | Hoarty et al. |
| 5,812,786 A | 9/1998 | Seazholtz et al. |
| 5,815,604 A | 9/1998 | Simons et al. |
| 5,818,438 A | 10/1998 | Howe et al. |
| 5,821,945 A | 10/1998 | Yeo et al. |
| 5,822,537 A | 10/1998 | Katseff et al. |
| 5,828,371 A | 10/1998 | Cline et al. |
| 5,844,594 A | 12/1998 | Ferguson |
| 5,845,083 A | 12/1998 | Hamadani et al. |
| 5,862,325 A | 1/1999 | Reed et al. |
| 5,864,820 A | 1/1999 | Case |
| 5,867,208 A | 2/1999 | McLaren |
| 5,883,661 A | 3/1999 | Hoarty et al. |
| 5,903,727 A | 5/1999 | Nielsen |
| 5,903,816 A | 5/1999 | Broadwin et al. |
| 5,905,522 A | 5/1999 | Lawler |
| 5,907,681 A | 5/1999 | Bates et al. |
| 5,917,822 A | 6/1999 | Lyles et al. |
| 5,946,352 A | 8/1999 | Rowlands et al. |
| 5,952,943 A | 9/1999 | Walsh et al. |
| 5,959,690 A | 9/1999 | Toebes et al. |
| 5,961,603 A | 10/1999 | Kunkel et al. |
| 5,963,203 A | 10/1999 | Goldberg et al. |
| 5,966,163 A | 10/1999 | Lin et al. |
| 5,978,756 A | 11/1999 | Walker et al. |
| 5,982,445 A | 11/1999 | Eyer et al. |
| 5,990,862 A | 11/1999 | Lewis |
| 5,995,146 A | 11/1999 | Rasmussen |
| 5,995,488 A | 11/1999 | Kalhunte et al. |
| 5,999,970 A | 12/1999 | Krisbergh et al. |
| 6,014,416 A | 1/2000 | Shin et al. |
| 6,021,386 A | 2/2000 | Davis et al. |
| 6,031,989 A | 2/2000 | Cordell |
| 6,034,678 A | 3/2000 | Hoarty |
| 6,049,539 A | 4/2000 | Lee et al. |
| 6,049,831 A | 4/2000 | Gardell et al. |
| 6,052,555 A | 4/2000 | Ferguson |
| 6,055,247 A | 4/2000 | Kubota et al. |
| 6,055,314 A | 4/2000 | Spies et al. |
| 6,055,315 A | 4/2000 | Doyle et al. |
| 6,064,377 A | 5/2000 | Hoarty et al. |
| 6,078,328 A | 6/2000 | Schumann et al. |
| 6,084,908 A | 7/2000 | Chiang et al. |
| 6,100,883 A | 8/2000 | Hoarty |
| 6,108,625 A | 8/2000 | Kim |

(56) References Cited

U.S. PATENT DOCUMENTS

| | | | |
|---|---|---|---|
| 6,115,076 A | 9/2000 | Linzer | |
| 6,131,182 A | 10/2000 | Beakes et al. | |
| 6,141,645 A | 10/2000 | Chi-Min et al. | |
| 6,141,693 A | 10/2000 | Perlman et al. | |
| 6,144,698 A | 11/2000 | Poon et al. | |
| 6,167,084 A | 12/2000 | Wang et al. | |
| 6,169,573 B1 | 1/2001 | Sampath-Kumar et al. | |
| 6,177,931 B1 | 1/2001 | Alexander et al. | |
| 6,182,072 B1 | 1/2001 | Leak et al. | |
| 6,184,878 B1 | 2/2001 | Alonso et al. | |
| 6,192,081 B1 | 2/2001 | Chiang et al. | |
| 6,198,822 B1 | 3/2001 | Doyle et al. | |
| 6,205,582 B1 | 3/2001 | Hoarty | |
| 6,226,041 B1 | 5/2001 | Florencio et al. | |
| 6,236,730 B1 | 5/2001 | Cowieson et al. | |
| 6,243,418 B1 | 6/2001 | Kim | |
| 6,253,238 B1 | 6/2001 | Lauder et al. | |
| 6,256,047 B1 | 7/2001 | Lsobe et al. | |
| 6,259,826 B1 | 7/2001 | Pollard et al. | |
| 6,266,369 B1 | 7/2001 | Wang et al. | |
| 6,266,684 B1 | 7/2001 | Kraus et al. | |
| 6,268,864 B1 * | 7/2001 | Chen | G06T 13/80 345/428 |
| 6,275,496 B1 | 8/2001 | Burns et al. | |
| 6,292,194 B1 | 9/2001 | Powell, III | |
| 6,305,020 B1 | 10/2001 | Hoarty et al. | |
| 6,310,601 B1 | 10/2001 | Moore et al. | |
| 6,317,151 B1 | 11/2001 | Ohsuga et al. | |
| 6,317,885 B1 | 11/2001 | Fries | |
| 6,349,284 B1 | 2/2002 | Park et al. | |
| 6,385,771 B1 | 5/2002 | Gordon | |
| 6,386,980 B1 | 5/2002 | Nishino et al. | |
| 6,389,075 B2 | 5/2002 | Wang et al. | |
| 6,389,218 B2 | 5/2002 | Gordon et al. | |
| 6,415,031 B1 | 7/2002 | Colligan et al. | |
| 6,415,437 B1 | 7/2002 | Ludvig et al. | |
| 6,438,140 B1 | 8/2002 | Jungers et al. | |
| 6,446,037 B1 | 9/2002 | Fielder et al. | |
| 6,459,427 B1 | 10/2002 | Mao et al. | |
| 6,477,182 B2 | 11/2002 | Calderone | |
| 6,480,210 B1 | 11/2002 | Martino et al. | |
| 6,481,012 B1 | 11/2002 | Gordon et al. | |
| 6,512,793 B1 | 1/2003 | Maeda | |
| 6,525,746 B1 | 2/2003 | Lau et al. | |
| 6,536,043 B1 | 3/2003 | Guedalia | |
| 6,539,545 B1 | 3/2003 | Dureau et al. | |
| 6,557,041 B2 | 4/2003 | Mallart | |
| 6,560,496 B1 | 5/2003 | Michnener | |
| 6,564,378 B1 | 5/2003 | Satterfield et al. | |
| 6,578,201 B1 | 6/2003 | Larocca et al. | |
| 6,579,184 B1 | 6/2003 | Tanskanen | |
| 6,584,153 B1 | 6/2003 | Gordon et al. | |
| 6,588,017 B1 | 7/2003 | Calderone | |
| 6,598,229 B2 | 7/2003 | Smyth et al. | |
| 6,604,224 B1 | 8/2003 | Armstrong et al. | |
| 6,614,442 B1 | 9/2003 | Ouyang et al. | |
| 6,621,870 B1 | 9/2003 | Gordon et al. | |
| 6,625,574 B1 | 9/2003 | Taniguchi et al. | |
| 6,639,896 B1 | 10/2003 | Goode et al. | |
| 6,645,076 B1 | 11/2003 | Sugai | |
| 6,651,252 B1 | 11/2003 | Gordon et al. | |
| 6,657,647 B1 | 12/2003 | Bright | |
| 6,675,385 B1 | 1/2004 | Wang | |
| 6,675,387 B1 | 1/2004 | Boucher | |
| 6,681,326 B2 | 1/2004 | Son et al. | |
| 6,681,397 B1 | 1/2004 | Tsai et al. | |
| 6,684,400 B1 | 1/2004 | Goode et al. | |
| 6,687,663 B1 | 2/2004 | McGrath et al. | |
| 6,691,208 B2 | 2/2004 | Dandrea et al. | |
| 6,697,376 B1 | 2/2004 | Son et al. | |
| 6,704,359 B1 | 3/2004 | Bayrakeri et al. | |
| 6,717,600 B2 | 4/2004 | Dutta et al. | |
| 6,718,552 B1 | 4/2004 | Goode | |
| 6,721,794 B2 | 4/2004 | Taylor et al. | |
| 6,721,956 B2 | 4/2004 | Wsilewski | |
| 6,727,929 B1 | 4/2004 | Bates et al. | |
| 6,731,605 B1 | 5/2004 | Deshpande | |
| 6,732,370 B1 | 5/2004 | Gordon et al. | |
| 6,747,991 B1 | 6/2004 | Hemy | |
| 6,754,271 B1 | 6/2004 | Gordon et al. | |
| 6,754,905 B2 | 6/2004 | Gordon et al. | |
| 6,758,540 B1 | 7/2004 | Adolph et al. | |
| 6,766,407 B1 | 7/2004 | Lisitsa et al. | |
| 6,771,704 B1 | 8/2004 | Hannah | |
| 6,785,902 B1 | 8/2004 | Zigmond et al. | |
| 6,807,528 B1 | 10/2004 | Truman et al. | |
| 6,810,528 B1 | 10/2004 | Chatani | |
| 6,813,690 B1 | 11/2004 | Lango et al. | |
| 6,817,947 B2 | 11/2004 | Tanskanen | |
| 6,850,490 B1 | 2/2005 | Woo et al. | |
| 6,886,178 B1 | 4/2005 | Mao et al. | |
| 6,907,574 B2 | 6/2005 | Xu et al. | |
| 6,931,291 B1 | 8/2005 | Alvarez-Tinoco et al. | |
| 6,941,019 B1 | 9/2005 | Mitchell et al. | |
| 6,941,574 B1 | 9/2005 | Broadwin et al. | |
| 6,947,509 B1 | 9/2005 | Wong | |
| 6,952,221 B1 | 10/2005 | Holtz et al. | |
| 6,956,899 B2 | 10/2005 | Hall et al. | |
| 7,016,540 B1 | 3/2006 | Gong et al. | |
| 7,030,890 B1 | 4/2006 | Jouet et al. | |
| 7,031,385 B1 | 4/2006 | Inoue et al. | |
| 7,050,113 B2 | 5/2006 | Cannpisano et al. | |
| 7,089,577 B1 | 8/2006 | Rakib et al. | |
| 7,093,028 B1 | 8/2006 | Shao et al. | |
| 7,095,402 B2 | 8/2006 | Kunil et al. | |
| 7,114,167 B2 | 9/2006 | Stemmer et al. | |
| 7,146,615 B1 | 12/2006 | Hervet et al. | |
| 7,151,782 B1 | 12/2006 | Oz et al. | |
| 7,158,676 B1 | 1/2007 | Rainsford | |
| 7,200,836 B2 | 4/2007 | Brodersen et al. | |
| 7,212,573 B2 | 5/2007 | Winger | |
| 7,224,731 B2 | 5/2007 | Mehrotra | |
| 7,272,556 B1 | 9/2007 | Aguilar et al. | |
| 7,310,619 B2 | 12/2007 | Baar et al. | |
| 7,325,043 B1 | 1/2008 | Rosenberg et al. | |
| 7,346,111 B2 | 3/2008 | Winger et al. | |
| 7,360,230 B1 | 4/2008 | Paz et al. | |
| 7,412,423 B1 | 8/2008 | Asano | |
| 7,412,505 B2 | 8/2008 | Stemmer et al. | |
| 7,421,082 B2 | 9/2008 | Kamiya et al. | |
| 7,444,306 B2 | 10/2008 | Varble | |
| 7,444,418 B2 | 10/2008 | Chou et al. | |
| 7,500,235 B2 | 3/2009 | Maynard et al. | |
| 7,508,941 B1 | 3/2009 | O'Toole, Jr. et al. | |
| 7,512,577 B2 | 3/2009 | Stemmer et al. | |
| 7,543,073 B2 | 6/2009 | Chou et al. | |
| 7,596,764 B2 | 9/2009 | Vienneau et al. | |
| 7,623,575 B2 | 11/2009 | Winger | |
| 7,669,220 B2 | 2/2010 | Goode | |
| 7,742,609 B2 | 6/2010 | Yeakel et al. | |
| 7,743,400 B2 | 6/2010 | Kurauchi | |
| 7,751,572 B2 | 7/2010 | Villemoes et al. | |
| 7,757,157 B1 | 7/2010 | Fukuda | |
| 7,830,388 B1 | 11/2010 | Lu | |
| 7,840,905 B1 | 11/2010 | Weber et al. | |
| 7,925,775 B2 | 4/2011 | Nishida | |
| 7,936,819 B2 | 5/2011 | Craig et al. | |
| 7,941,645 B1 | 5/2011 | Riach et al. | |
| 7,945,616 B2 | 5/2011 | Zeng et al. | |
| 7,970,263 B1 | 6/2011 | Asch | |
| 7,987,489 B2 | 7/2011 | Krzyzanowski et al. | |
| 8,027,353 B2 | 9/2011 | Damola et al. | |
| 8,036,271 B2 | 10/2011 | Winger et al. | |
| 8,046,798 B1 | 10/2011 | Schlack et al. | |
| 8,074,248 B2 | 12/2011 | Sigmon et al. | |
| 8,078,603 B1 * | 12/2011 | Chandratillake | G06F 17/3084 707/706 |
| 8,118,676 B2 | 2/2012 | Craig et al. | |
| 8,136,033 B1 | 3/2012 | Bhargava et al. | |
| 8,149,917 B2 | 4/2012 | Zhang et al. | |
| 8,155,194 B2 | 4/2012 | Winger et al. | |
| 8,155,202 B2 | 4/2012 | Landau | |
| 8,170,107 B2 | 5/2012 | Winger | |
| 8,194,862 B2 | 6/2012 | Herr et al. | |

(56) References Cited

U.S. PATENT DOCUMENTS

| | | |
|---|---|---|
| 8,243,630 B2 | 8/2012 | Luo et al. |
| 8,270,439 B2 | 9/2012 | Herr et al. |
| 8,284,842 B2 | 10/2012 | Craig et al. |
| 8,296,424 B2 | 10/2012 | Malloy et al. |
| 8,370,869 B2 | 2/2013 | Paek et al. |
| 8,411,754 B2 | 4/2013 | Zhang et al. |
| 8,442,110 B2 | 5/2013 | Pavlovskaia et al. |
| 8,473,996 B2 | 6/2013 | Gordon et al. |
| 8,619,867 B2 | 12/2013 | Craig et al. |
| 8,621,500 B2 | 12/2013 | Weaver et al. |
| 8,656,430 B2 | 2/2014 | Doyle |
| 8,781,240 B2 | 7/2014 | Srinivasan et al. |
| 8,839,317 B1 | 9/2014 | Rieger et al. |
| 8,914,813 B1 | 12/2014 | Sigurdsson et al. |
| 9,204,113 B1 | 12/2015 | Kwok et al. |
| 9,226,018 B1 | 12/2015 | Filippov et al. |
| 9,621,926 B1 | 4/2017 | Lee et al. |
| 9,635,440 B2 | 4/2017 | Lacroix |
| 2001/0005360 A1 | 6/2001 | Lee |
| 2001/0008845 A1 | 7/2001 | Kusuda et al. |
| 2001/0027563 A1 | 10/2001 | White et al. |
| 2001/0043215 A1* | 11/2001 | Middleton, III .. G06F 17/30905 345/473 |
| 2001/0049301 A1 | 12/2001 | Masuda et al. |
| 2002/0007491 A1 | 1/2002 | Schiller et al. |
| 2002/0013812 A1 | 1/2002 | Krueger et al. |
| 2002/0016161 A1 | 2/2002 | Dellien et al. |
| 2002/0021353 A1 | 2/2002 | DeNies |
| 2002/0026642 A1 | 2/2002 | Augenbraun et al. |
| 2002/0027567 A1 | 3/2002 | Niamir |
| 2002/0032697 A1 | 3/2002 | French et al. |
| 2002/0040482 A1 | 4/2002 | Sextro et al. |
| 2002/0047899 A1 | 4/2002 | Son et al. |
| 2002/0049975 A1 | 4/2002 | Thomas et al. |
| 2002/0054578 A1 | 5/2002 | Zhang et al. |
| 2002/0056083 A1 | 5/2002 | Istvan |
| 2002/0056107 A1 | 5/2002 | Schlack |
| 2002/0056136 A1 | 5/2002 | Wistendahl et al. |
| 2002/0059644 A1 | 5/2002 | Andrade et al. |
| 2002/0062484 A1 | 5/2002 | De Lange et al. |
| 2002/0067766 A1 | 6/2002 | Sakamoto et al. |
| 2002/0069267 A1 | 6/2002 | Thiele |
| 2002/0072408 A1 | 6/2002 | Kumagai |
| 2002/0078171 A1 | 6/2002 | Schneider |
| 2002/0078456 A1 | 6/2002 | Hudson et al. |
| 2002/0083464 A1 | 6/2002 | Tomsen et al. |
| 2002/0091738 A1 | 7/2002 | Rohrabaugh et al. |
| 2002/0095689 A1 | 7/2002 | Novak |
| 2002/0105531 A1 | 8/2002 | Niemi |
| 2002/0108121 A1 | 8/2002 | Alao et al. |
| 2002/0116705 A1 | 8/2002 | Perlman et al. |
| 2002/0131511 A1 | 9/2002 | Zenoni |
| 2002/0136298 A1 | 9/2002 | Anantharamu et al. |
| 2002/0152318 A1 | 10/2002 | Menon et al. |
| 2002/0171765 A1 | 11/2002 | Waki et al. |
| 2002/0175931 A1 | 11/2002 | Holtz et al. |
| 2002/0178278 A1 | 11/2002 | Ducharme |
| 2002/0178447 A1 | 11/2002 | Plotnick et al. |
| 2002/0188628 A1 | 12/2002 | Cooper et al. |
| 2002/0191851 A1 | 12/2002 | Keinan |
| 2002/0194592 A1 | 12/2002 | Tsuchida et al. |
| 2002/0196746 A1 | 12/2002 | Allen |
| 2003/0005452 A1 | 1/2003 | Rodriguez |
| 2003/0018796 A1 | 1/2003 | Chou et al. |
| 2003/0020671 A1* | 1/2003 | Santoro et al. ................. 345/1.3 |
| 2003/0027517 A1 | 2/2003 | Callway et al. |
| 2003/0035486 A1 | 2/2003 | Kato et al. |
| 2003/0038893 A1 | 2/2003 | Rajamaki et al. |
| 2003/0039398 A1 | 2/2003 | McIntyre |
| 2003/0046690 A1 | 3/2003 | Miller |
| 2003/0051253 A1 | 3/2003 | Barone, Jr. |
| 2003/0058941 A1 | 3/2003 | Chen et al. |
| 2003/0061451 A1 | 3/2003 | Beyda |
| 2003/0065739 A1 | 4/2003 | Shnier |
| 2003/0066093 A1 | 4/2003 | Cruz-Rivera et al. |
| 2003/0071792 A1 | 4/2003 | Safadi |
| 2003/0072372 A1 | 4/2003 | Shen et al. |
| 2003/0076546 A1 | 4/2003 | Johnson et al. |
| 2003/0088328 A1 | 5/2003 | Nishio et al. |
| 2003/0088400 A1 | 5/2003 | Nishio et al. |
| 2003/0095790 A1 | 5/2003 | Joshi |
| 2003/0107443 A1 | 6/2003 | Clancy |
| 2003/0122836 A1 | 7/2003 | Doyle et al. |
| 2003/0123664 A1 | 7/2003 | Pedlow, Jr. et al. |
| 2003/0126608 A1 | 7/2003 | Safadi |
| 2003/0126611 A1 | 7/2003 | Kuczynski-Brown |
| 2003/0131349 A1 | 7/2003 | Kuczynski-Brown |
| 2003/0135860 A1 | 7/2003 | Dureau |
| 2003/0169373 A1 | 9/2003 | Peters et al. |
| 2003/0177199 A1 | 9/2003 | Zenoni |
| 2003/0188309 A1 | 10/2003 | Yuen |
| 2003/0189980 A1 | 10/2003 | Dvir et al. |
| 2003/0196174 A1 | 10/2003 | Cote et al. |
| 2003/0208768 A1 | 11/2003 | Urdang et al. |
| 2003/0217360 A1 | 11/2003 | Gordon et al. |
| 2003/0229719 A1 | 12/2003 | Iwata et al. |
| 2003/0229900 A1 | 12/2003 | Reisman |
| 2003/0231218 A1 | 12/2003 | Amadio |
| 2004/0016000 A1 | 1/2004 | Zhang et al. |
| 2004/0034873 A1 | 2/2004 | Zenoni |
| 2004/0040035 A1 | 2/2004 | Carlucci et al. |
| 2004/0055007 A1 | 3/2004 | Allport |
| 2004/0073924 A1 | 4/2004 | Pendakur |
| 2004/0078822 A1 | 4/2004 | Breen et al. |
| 2004/0088375 A1 | 5/2004 | Sethi et al. |
| 2004/0091171 A1 | 5/2004 | Bone |
| 2004/0111526 A1 | 6/2004 | Baldwin et al. |
| 2004/0117827 A1 | 6/2004 | Karaoguz et al. |
| 2004/0128686 A1 | 7/2004 | Boyer et al. |
| 2004/0133704 A1 | 7/2004 | Krzyzanowski et al. |
| 2004/0136698 A1 | 7/2004 | Mock |
| 2004/0139158 A1 | 7/2004 | Datta |
| 2004/0151385 A1 | 8/2004 | Oneda et al. |
| 2004/0157662 A1 | 8/2004 | Tsuchiya |
| 2004/0163101 A1 | 8/2004 | Swix et al. |
| 2004/0184542 A1 | 9/2004 | Fujimoto |
| 2004/0193648 A1 | 9/2004 | Lai et al. |
| 2004/0210824 A1 | 10/2004 | Shoff et al. |
| 2004/0216045 A1 | 10/2004 | Martin et al. |
| 2004/0261106 A1 | 12/2004 | Hoffman |
| 2004/0261114 A1 | 12/2004 | Addington et al. |
| 2004/0268419 A1 | 12/2004 | Danker et al. |
| 2005/0015259 A1 | 1/2005 | Thumpudi et al. |
| 2005/0015816 A1 | 1/2005 | Christofalo et al. |
| 2005/0021830 A1 | 1/2005 | Urzaiz et al. |
| 2005/0034155 A1 | 2/2005 | Gordon et al. |
| 2005/0034162 A1 | 2/2005 | White et al. |
| 2005/0044575 A1 | 2/2005 | Der Kuyl |
| 2005/0055685 A1 | 3/2005 | Maynard et al. |
| 2005/0055721 A1 | 3/2005 | Zigmond et al. |
| 2005/0071876 A1 | 3/2005 | van Beek |
| 2005/0076134 A1 | 4/2005 | Bialik et al. |
| 2005/0089091 A1 | 4/2005 | Kim et al. |
| 2005/0091690 A1 | 4/2005 | Delpuch et al. |
| 2005/0091695 A1 | 4/2005 | Paz et al. |
| 2005/0105608 A1* | 5/2005 | Coleman et al. ........ 375/240.01 |
| 2005/0114906 A1 | 5/2005 | Hoarty et al. |
| 2005/0132305 A1 | 6/2005 | Guichard et al. |
| 2005/0135385 A1 | 6/2005 | Jenkins et al. |
| 2005/0141613 A1 | 6/2005 | Kelly et al. |
| 2005/0149988 A1 | 7/2005 | Grannan |
| 2005/0155063 A1 | 7/2005 | Bayrakeri et al. |
| 2005/0160088 A1 | 7/2005 | Scallan et al. |
| 2005/0166257 A1 | 7/2005 | Feinleib et al. |
| 2005/0177853 A1 | 8/2005 | Williams et al. |
| 2005/0180502 A1 | 8/2005 | Puri |
| 2005/0198682 A1 | 9/2005 | Wright |
| 2005/0213586 A1 | 9/2005 | Cyganski et al. |
| 2005/0216933 A1 | 9/2005 | Black |
| 2005/0216940 A1 | 9/2005 | Black |
| 2005/0226426 A1 | 10/2005 | Oomen et al. |
| 2005/0232309 A1 | 10/2005 | Kavaler |
| 2005/0273832 A1 | 12/2005 | Zigmond et al. |
| 2005/0283741 A1* | 12/2005 | Balabanovic et al. ........ 715/838 |

(56) References Cited

U.S. PATENT DOCUMENTS

| | | |
|---|---|---|
| 2006/0001737 A1 | 1/2006 | Dawson et al. |
| 2006/0020960 A1 | 1/2006 | Relan et al. |
| 2006/0020994 A1 | 1/2006 | Crane et al. |
| 2006/0026663 A1 | 2/2006 | Kortum et al. |
| 2006/0031906 A1 | 2/2006 | Kaneda |
| 2006/0039481 A1 | 2/2006 | Shen et al. |
| 2006/0041910 A1 | 2/2006 | Hatanaka et al. |
| 2006/0064716 A1* | 3/2006 | Sull ............ G06F 17/30793 725/37 |
| 2006/0088105 A1 | 4/2006 | Shen et al. |
| 2006/0095944 A1 | 5/2006 | Demircin et al. |
| 2006/0112338 A1 | 5/2006 | Joung et al. |
| 2006/0117340 A1 | 6/2006 | Pavlovskaia et al. |
| 2006/0143678 A1 | 6/2006 | Cho et al. |
| 2006/0161538 A1 | 7/2006 | Kiilerich |
| 2006/0173985 A1 | 8/2006 | Moore |
| 2006/0174021 A1 | 8/2006 | Osborne et al. |
| 2006/0174026 A1 | 8/2006 | Robinson et al. |
| 2006/0174289 A1 | 8/2006 | Theberge |
| 2006/0184614 A1 | 8/2006 | Baratto et al. |
| 2006/0195884 A1 | 8/2006 | van Zoest et al. |
| 2006/0203913 A1 | 9/2006 | Kim et al. |
| 2006/0212203 A1 | 9/2006 | Furuno |
| 2006/0218601 A1 | 9/2006 | Michel |
| 2006/0230428 A1 | 10/2006 | Craig et al. |
| 2006/0242570 A1 | 10/2006 | Croft et al. |
| 2006/0256865 A1 | 11/2006 | Westerman |
| 2006/0267995 A1 | 11/2006 | Radloff et al. |
| 2006/0269086 A1 | 11/2006 | Page et al. |
| 2006/0271985 A1 | 11/2006 | Hoffman et al. |
| 2006/0285586 A1 | 12/2006 | Westerman |
| 2006/0285819 A1 | 12/2006 | Kelly et al. |
| 2007/0009035 A1 | 1/2007 | Craig et al. |
| 2007/0009036 A1 | 1/2007 | Craig et al. |
| 2007/0009042 A1 | 1/2007 | Craig et al. |
| 2007/0011702 A1 | 1/2007 | Vaysman |
| 2007/0025639 A1 | 2/2007 | Zhou et al. |
| 2007/0033528 A1 | 2/2007 | Merrit et al. |
| 2007/0033631 A1 | 2/2007 | Gordon et al. |
| 2007/0043667 A1 | 2/2007 | Qawami et al. |
| 2007/0074251 A1 | 3/2007 | Oguz et al. |
| 2007/0079325 A1 | 4/2007 | de Heer |
| 2007/0115941 A1 | 5/2007 | Patel et al. |
| 2007/0124282 A1* | 5/2007 | Wittkotter ................ 707/3 |
| 2007/0124795 A1 | 5/2007 | McKissick et al. |
| 2007/0130446 A1 | 6/2007 | Minakami |
| 2007/0130592 A1 | 6/2007 | Haeusel |
| 2007/0152984 A1 | 7/2007 | Ordin et al. |
| 2007/0162953 A1* | 7/2007 | Bolliger et al. .......... 725/142 |
| 2007/0172061 A1 | 7/2007 | Pinder |
| 2007/0174790 A1* | 7/2007 | Jing et al. ................ 715/838 |
| 2007/0178243 A1 | 8/2007 | Dong et al. |
| 2007/0192798 A1 | 8/2007 | Morgan |
| 2007/0234220 A1 | 10/2007 | Khan et al. |
| 2007/0237232 A1 | 10/2007 | Chang et al. |
| 2007/0266412 A1 | 11/2007 | Trowbridge et al. |
| 2007/0300280 A1 | 12/2007 | Turner et al. |
| 2008/0034306 A1* | 2/2008 | Ording ............ G06F 3/04817 715/764 |
| 2008/0046373 A1 | 2/2008 | Kim |
| 2008/0046928 A1* | 2/2008 | Poling et al. ................ 725/40 |
| 2008/0052742 A1 | 2/2008 | Kopf |
| 2008/0060034 A1* | 3/2008 | Egnal ................ G01C 11/02 725/105 |
| 2008/0066135 A1 | 3/2008 | Brodersen et al. |
| 2008/0084503 A1 | 4/2008 | Kondo |
| 2008/0086688 A1* | 4/2008 | Chandratillake et al. .... 715/719 |
| 2008/0086747 A1 | 4/2008 | Rasanen et al. |
| 2008/0094368 A1 | 4/2008 | Ording et al. |
| 2008/0097953 A1 | 4/2008 | Levy et al. |
| 2008/0098212 A1 | 4/2008 | Helms et al. |
| 2008/0098450 A1 | 4/2008 | Wu et al. |
| 2008/0104520 A1 | 5/2008 | Swenson et al. |
| 2008/0109556 A1 | 5/2008 | Karlberg |
| 2008/0127255 A1 | 5/2008 | Ress et al. |
| 2008/0144711 A1* | 6/2008 | Chui ............ H04N 19/159 375/240.01 |
| 2008/0154583 A1 | 6/2008 | Goto et al. |
| 2008/0163059 A1 | 7/2008 | Craner |
| 2008/0163286 A1 | 7/2008 | Rudolph et al. |
| 2008/0170619 A1 | 7/2008 | Landau |
| 2008/0170622 A1 | 7/2008 | Gordon et al. |
| 2008/0172441 A1 | 7/2008 | Speicher et al. |
| 2008/0178125 A1* | 7/2008 | Elsbree et al. ............. 715/862 |
| 2008/0178243 A1 | 7/2008 | Dong et al. |
| 2008/0178249 A1 | 7/2008 | Gordon et al. |
| 2008/0181221 A1 | 7/2008 | Kampmann et al. |
| 2008/0184120 A1 | 7/2008 | OBrien-Strain et al. |
| 2008/0189740 A1 | 8/2008 | Carpenter et al. |
| 2008/0195573 A1 | 8/2008 | Onoda et al. |
| 2008/0201736 A1 | 8/2008 | Gordon et al. |
| 2008/0212942 A1 | 9/2008 | Gordon et al. |
| 2008/0222199 A1 | 9/2008 | Tiu et al. |
| 2008/0232243 A1 | 9/2008 | Oren |
| 2008/0232452 A1 | 9/2008 | Sullivan et al. |
| 2008/0243918 A1 | 10/2008 | Holtman |
| 2008/0243998 A1 | 10/2008 | Oh et al. |
| 2008/0244681 A1 | 10/2008 | Gossweiler et al. |
| 2008/0246759 A1 | 10/2008 | Summers |
| 2008/0253440 A1 | 10/2008 | Srinivasan et al. |
| 2008/0253685 A1* | 10/2008 | Kuranov ............ G06T 3/4038 382/284 |
| 2008/0271080 A1 | 10/2008 | Grossweiler et al. |
| 2009/0003446 A1 | 1/2009 | Wu et al. |
| 2009/0003705 A1 | 1/2009 | Zou et al. |
| 2009/0007199 A1 | 1/2009 | La Joie |
| 2009/0025027 A1 | 1/2009 | Craner |
| 2009/0031341 A1 | 1/2009 | Schlack et al. |
| 2009/0041118 A1 | 2/2009 | Pavlovskaia et al. |
| 2009/0083781 A1* | 3/2009 | Yang et al. ................ 725/20 |
| 2009/0083813 A1 | 3/2009 | Dolce et al. |
| 2009/0083824 A1 | 3/2009 | McCarthy et al. |
| 2009/0089188 A1 | 4/2009 | Ku et al. |
| 2009/0094113 A1 | 4/2009 | Berry et al. |
| 2009/0094646 A1 | 4/2009 | Walter et al. |
| 2009/0100465 A1 | 4/2009 | Kulakowski |
| 2009/0100489 A1 | 4/2009 | Strothmann |
| 2009/0106269 A1 | 4/2009 | Zuckerman et al. |
| 2009/0106386 A1 | 4/2009 | Zuckerman et al. |
| 2009/0106392 A1 | 4/2009 | Zuckerman et al. |
| 2009/0106425 A1 | 4/2009 | Zuckerman et al. |
| 2009/0106441 A1 | 4/2009 | Zuckerman et al. |
| 2009/0106451 A1 | 4/2009 | Zuckerman et al. |
| 2009/0106511 A1 | 4/2009 | Zuckerman et al. |
| 2009/0113009 A1 | 4/2009 | Stemmer et al. |
| 2009/0132942 A1* | 5/2009 | Santoro et al. ............ 715/765 |
| 2009/0138966 A1 | 5/2009 | Krause et al. |
| 2009/0144781 A1 | 6/2009 | Glaser et al. |
| 2009/0146779 A1 | 6/2009 | Kumar et al. |
| 2009/0157868 A1 | 6/2009 | Chaudhry |
| 2009/0158369 A1 | 6/2009 | Van Vleck et al. |
| 2009/0160694 A1 | 6/2009 | Di Flora |
| 2009/0172431 A1 | 7/2009 | Gupta et al. |
| 2009/0172726 A1 | 7/2009 | Vantalon et al. |
| 2009/0172757 A1 | 7/2009 | Aldrey et al. |
| 2009/0178098 A1 | 7/2009 | Westbrook et al. |
| 2009/0183197 A1 | 7/2009 | Matthews |
| 2009/0183219 A1 | 7/2009 | Maynard et al. |
| 2009/0189890 A1 | 7/2009 | Corbett et al. |
| 2009/0193452 A1 | 7/2009 | Russ et al. |
| 2009/0196346 A1 | 8/2009 | Zhang et al. |
| 2009/0204920 A1* | 8/2009 | Beverley et al. ........... 715/768 |
| 2009/0210899 A1 | 8/2009 | Lawrence-Apfelbaum et al. |
| 2009/0225790 A1 | 9/2009 | Shay et al. |
| 2009/0228620 A1 | 9/2009 | Thomas et al. |
| 2009/0228922 A1 | 9/2009 | Haj-Khalil et al. |
| 2009/0233593 A1 | 9/2009 | Ergen et al. |
| 2009/0251478 A1 | 10/2009 | Maillot et al. |
| 2009/0254960 A1 | 10/2009 | Yarom et al. |
| 2009/0265617 A1 | 10/2009 | Randall et al. |
| 2009/0265746 A1 | 10/2009 | Halen et al. |
| 2009/0271512 A1 | 10/2009 | Jorgensen |
| 2009/0271818 A1 | 10/2009 | Schlack |
| 2009/0298535 A1 | 12/2009 | Klein et al. |

(56) References Cited

U.S. PATENT DOCUMENTS

| | | |
|---|---|---|
| 2009/0313674 A1 | 12/2009 | Ludvig et al. |
| 2009/0316709 A1 | 12/2009 | Polcha et al. |
| 2009/0328109 A1 | 12/2009 | Pavlovskaia et al. |
| 2010/0009623 A1 | 1/2010 | Hennenhoefer et al. |
| 2010/0033638 A1 | 2/2010 | O'Donnell et al. |
| 2010/0035682 A1* | 2/2010 | Gentile et al. ............ 463/30 |
| 2010/0054268 A1 | 3/2010 | Divivier |
| 2010/0058404 A1 | 3/2010 | Rouse |
| 2010/0067571 A1 | 3/2010 | White et al. |
| 2010/0073371 A1* | 3/2010 | Ernst .............. G09G 5/393 345/428 |
| 2010/0077441 A1 | 3/2010 | Thomas et al. |
| 2010/0104021 A1 | 4/2010 | Schmit |
| 2010/0115573 A1 | 5/2010 | Srinivasan et al. |
| 2010/0118972 A1 | 5/2010 | Zhang et al. |
| 2010/0131411 A1 | 5/2010 | Jogand-Coulomb et al. |
| 2010/0131996 A1 | 5/2010 | Gauld |
| 2010/0146139 A1 | 6/2010 | Brockmann |
| 2010/0153885 A1 | 6/2010 | Yates |
| 2010/0158109 A1 | 6/2010 | Dahlby |
| 2010/0161825 A1 | 6/2010 | Ronca et al. |
| 2010/0166071 A1 | 7/2010 | Wu et al. |
| 2010/0174776 A1 | 7/2010 | Westberg et al. |
| 2010/0175080 A1 | 7/2010 | Yuen et al. |
| 2010/0180307 A1 | 7/2010 | Hayes et al. |
| 2010/0211983 A1* | 8/2010 | Chou .................... 725/93 |
| 2010/0226428 A1 | 9/2010 | Thevathasan et al. |
| 2010/0235861 A1 | 9/2010 | Schein et al. |
| 2010/0242073 A1 | 9/2010 | Gordon et al. |
| 2010/0251167 A1* | 9/2010 | DeLuca et al. ............ 715/786 |
| 2010/0254370 A1 | 10/2010 | Jana et al. |
| 2010/0265344 A1 | 10/2010 | Velarde et al. |
| 2010/0325655 A1 | 12/2010 | Perez |
| 2010/0325668 A1 | 12/2010 | Young et al. |
| 2011/0002376 A1 | 1/2011 | Ahmed et al. |
| 2011/0002470 A1 | 1/2011 | Purnhagen et al. |
| 2011/0023069 A1 | 1/2011 | Dowens |
| 2011/0035227 A1 | 2/2011 | Lee et al. |
| 2011/0067061 A1 | 3/2011 | Karaoguz et al. |
| 2011/0072474 A1 | 3/2011 | Springer et al. |
| 2011/0096828 A1 | 4/2011 | Chen et al. |
| 2011/0099594 A1* | 4/2011 | Chen ............ H04N 21/23439 725/105 |
| 2011/0107375 A1 | 5/2011 | Stahl et al. |
| 2011/0110433 A1* | 5/2011 | Bjontegaard ....... H04N 19/176 375/240.18 |
| 2011/0110642 A1 | 5/2011 | Salomons et al. |
| 2011/0150421 A1* | 6/2011 | Sasaki et al. ............ 386/241 |
| 2011/0153776 A1 | 6/2011 | Opala et al. |
| 2011/0161517 A1 | 6/2011 | Ferguson |
| 2011/0167468 A1 | 7/2011 | Lee et al. |
| 2011/0173590 A1 | 7/2011 | Yanes |
| 2011/0191684 A1* | 8/2011 | Greenberg ............ 715/719 |
| 2011/0202948 A1 | 8/2011 | Bildgen et al. |
| 2011/0211591 A1 | 9/2011 | Traub et al. |
| 2011/0231878 A1 | 9/2011 | Hunter et al. |
| 2011/0243024 A1 | 10/2011 | Osterling et al. |
| 2011/0258584 A1 | 10/2011 | Williams et al. |
| 2011/0261889 A1 | 10/2011 | Francisco |
| 2011/0283304 A1 | 11/2011 | Roberts |
| 2011/0289536 A1 | 11/2011 | Poder et al. |
| 2011/0296312 A1 | 12/2011 | Boyer et al. |
| 2011/0317982 A1 | 12/2011 | Xu et al. |
| 2012/0008786 A1 | 1/2012 | Cronk et al. |
| 2012/0023126 A1* | 1/2012 | Jin et al. ............ 707/769 |
| 2012/0023250 A1* | 1/2012 | Chen ............ H04N 21/234327 709/231 |
| 2012/0030212 A1* | 2/2012 | Koopmans et al. ......... 707/741 |
| 2012/0030706 A1 | 2/2012 | Hulse et al. |
| 2012/0137337 A1 | 5/2012 | Sigmon et al. |
| 2012/0204217 A1 | 8/2012 | Regis et al. |
| 2012/0209815 A1* | 8/2012 | Carson et al. ............ 707/661 |
| 2012/0216232 A1 | 8/2012 | Chen et al. |
| 2012/0221853 A1 | 8/2012 | Wingert et al. |
| 2012/0224641 A1 | 9/2012 | Haberman et al. |
| 2012/0257671 A1 | 10/2012 | Brockmann et al. |
| 2012/0271920 A1 | 10/2012 | Isaksson |
| 2012/0284753 A1 | 11/2012 | Roberts et al. |
| 2012/0297081 A1 | 11/2012 | Karlsson et al. |
| 2013/0003826 A1 | 1/2013 | Craig et al. |
| 2013/0042271 A1 | 2/2013 | Yellin |
| 2013/0047074 A1 | 2/2013 | Vestergaard et al. |
| 2013/0071095 A1* | 3/2013 | Chauvier et al. ............ 386/343 |
| 2013/0086610 A1 | 4/2013 | Brockmann |
| 2013/0179787 A1 | 7/2013 | Brockmann et al. |
| 2013/0198776 A1 | 8/2013 | Brockmann |
| 2013/0254308 A1* | 9/2013 | Rose et al. ............ 709/206 |
| 2013/0254675 A1 | 9/2013 | de Andrade et al. |
| 2013/0272394 A1 | 10/2013 | Brockmann et al. |
| 2013/0276015 A1 | 10/2013 | Rothschild |
| 2013/0283318 A1 | 10/2013 | Wannamaker |
| 2013/0297887 A1 | 11/2013 | Woodward |
| 2013/0304818 A1 | 11/2013 | Brumleve et al. |
| 2013/0305051 A1 | 11/2013 | Fu et al. |
| 2014/0032635 A1 | 1/2014 | Pimmel et al. |
| 2014/0033036 A1* | 1/2014 | Gaur et al. ............ 715/719 |
| 2014/0081954 A1 | 3/2014 | Elizarov |
| 2014/0089469 A1 | 3/2014 | Ramamurthy et al. |
| 2014/0123169 A1 | 5/2014 | Koukarine et al. |
| 2014/0157298 A1 | 6/2014 | Murphy |
| 2014/0168515 A1 | 6/2014 | Sagliocco |
| 2014/0223307 A1 | 8/2014 | McIntosh et al. |
| 2014/0223482 A1 | 8/2014 | McIntosh et al. |
| 2014/0267074 A1 | 9/2014 | Balci |
| 2014/0269930 A1 | 9/2014 | Robinson et al. |
| 2014/0289627 A1 | 9/2014 | Brockmann et al. |
| 2014/0317532 A1 | 10/2014 | Ma et al. |
| 2014/0344861 A1 | 11/2014 | Berner et al. |
| 2015/0023372 A1 | 1/2015 | Boatright |
| 2015/0037011 A1 | 2/2015 | Hubner et al. |
| 2015/0103880 A1 | 4/2015 | Diard |
| 2015/0135209 A1 | 5/2015 | LaBosco |
| 2015/0139603 A1 | 5/2015 | Silverstein et al. |
| 2015/0195525 A1 | 7/2015 | Sullivan et al. |
| 2016/0050069 A1 | 2/2016 | Griffin et al. |
| 2016/0119624 A1 | 4/2016 | Frishman |
| 2016/0142468 A1 | 5/2016 | Song et al. |
| 2016/0357583 A1 | 12/2016 | Decker et al. |
| 2017/0078721 A1 | 3/2017 | Brockmann et al. |

FOREIGN PATENT DOCUMENTS

| | | |
|---|---|---|
| AT | 250313 T | 10/2003 |
| AT | 472152 T | 7/2010 |
| AT | 475266 T | 8/2010 |
| AU | 550086 B2 | 2/1986 |
| AU | 199060189 | 11/1990 |
| AU | 620735 B2 | 2/1992 |
| AU | 199184838 | 4/1992 |
| AU | 643828 B2 | 11/1993 |
| AU | 2004253127 A1 | 1/2005 |
| AU | 2005278122 A1 | 3/2006 |
| AU | 2010339376 A1 | 8/2012 |
| AU | 2011249132 A1 | 11/2012 |
| AU | 2011258972 A1 | 11/2012 |
| AU | 2011315950 A1 | 5/2013 |
| CA | 682776 A | 3/1964 |
| CA | 2052477 | 3/1992 |
| CA | 1302554 | 6/1992 |
| CA | 2163500 | 5/1996 |
| CA | 2231391 A1 | 5/1997 |
| CA | 2273365 A1 | 6/1998 |
| CA | 2313133 A1 | 6/1999 |
| CA | 2313161 A1 | 6/1999 |
| CA | 2528499 A1 | 1/2005 |
| CA | 2569407 A1 | 3/2006 |
| CA | 2728797 A1 | 4/2010 |
| CA | 2787913 A1 | 7/2011 |
| CA | 2798541 A1 | 12/2011 |
| CA | 2814070 A1 | 4/2012 |
| CN | 1507751 A | 6/2004 |
| CN | 1969555 A | 5/2007 |
| CN | 101180109 A | 5/2008 |
| CN | 101627424 A | 1/2010 |

(56) References Cited

FOREIGN PATENT DOCUMENTS

| | | |
|---|---|---|
| CN | 101637023 A | 1/2010 |
| CN | 102007773 A | 4/2011 |
| CN | 103647980 A | 3/2014 |
| DE | 4408355 A1 | 10/1994 |
| DE | 69516139 | 12/2000 |
| DE | 69132518 | 9/2001 |
| DE | 69333207 | 7/2004 |
| DE | 98961961 T1 | 8/2007 |
| DE | 602008001596 | 8/2010 |
| DE | 602006015650 | 9/2010 |
| EP | 0093549 A2 | 11/1983 |
| EP | 0128771 A2 | 12/1984 |
| EP | 0419137 A2 | 3/1991 |
| EP | 0449633 A1 | 10/1991 |
| EP | 0477786 A2 | 4/1992 |
| EP | 0523618 A2 | 1/1993 |
| EP | 0534139 A2 | 3/1993 |
| EP | 0568453 A1 | 11/1993 |
| EP | 0588653 A2 | 3/1994 |
| EP | 0594350 A1 | 4/1994 |
| EP | 0612916 A2 | 8/1994 |
| EP | 0624039 A2 | 11/1994 |
| EP | 0638219 A1 | 2/1995 |
| EP | 0643523 A1 | 3/1995 |
| EP | 0661888 A2 | 7/1995 |
| EP | 0714684 A1 | 6/1996 |
| EP | 0746158 A2 | 12/1996 |
| EP | 0761066 A1 | 3/1997 |
| EP | 0789972 A1 | 8/1997 |
| EP | 0830786 A1 | 3/1998 |
| EP | 0861560 A1 | 9/1998 |
| EP | 0 881 808 A2 | 12/1998 |
| EP | 0933966 | 8/1999 |
| EP | 0933966 A1 | 8/1999 |
| EP | 1026872 A1 | 8/2000 |
| EP | 1038397 A1 | 9/2000 |
| EP | 1038399 A1 | 9/2000 |
| EP | 1038400 A1 | 9/2000 |
| EP | 1038401 A1 | 9/2000 |
| EP | 1051039 A2 | 11/2000 |
| EP | 1055331 A1 | 11/2000 |
| EP | 1120968 A1 | 8/2001 |
| EP | 1345446 A1 | 9/2003 |
| EP | 1422929 A2 | 5/2004 |
| EP | 1428562 A2 | 6/2004 |
| EP | 1521476 A1 | 4/2005 |
| EP | 1645115 A1 | 4/2006 |
| EP | 1725044 A2 | 11/2006 |
| EP | 1767708 A2 | 3/2007 |
| EP | 1771003 A1 | 4/2007 |
| EP | 1772014 A1 | 4/2007 |
| EP | 1877150 A1 | 1/2008 |
| EP | 1887148 A2 | 2/2008 |
| EP | 1900200 A1 | 3/2008 |
| EP | 1902583 A1 | 3/2008 |
| EP | 1908293 A1 | 4/2008 |
| EP | 1911288 A2 | 4/2008 |
| EP | 1918802 A1 | 5/2008 |
| EP | 2100296 A1 | 9/2009 |
| EP | 2105019 A2 | 9/2009 |
| EP | 2106665 A2 | 10/2009 |
| EP | 2116051 A2 | 11/2009 |
| EP | 2124440 A1 | 11/2009 |
| EP | 2248341 A1 | 11/2010 |
| EP | 2269377 A2 | 1/2011 |
| EP | 2271098 A1 | 1/2011 |
| EP | 2304953 A2 | 4/2011 |
| EP | 2357555 A1 | 8/2011 |
| EP | 2364019 A2 | 9/2011 |
| EP | 2384001 A1 | 11/2011 |
| EP | 2409493 A2 | 1/2012 |
| EP | 2477414 A2 | 7/2012 |
| EP | 2487919 A2 | 8/2012 |
| EP | 2520090 A2 | 11/2012 |
| EP | 2567545 A1 | 3/2013 |
| EP | 2577437 A1 | 4/2013 |
| EP | 2628306 A2 | 8/2013 |
| EP | 2632164 A2 | 8/2013 |
| EP | 2632165 A2 | 8/2013 |
| EP | 2695388 A2 | 2/2014 |
| ES | 2207635 T3 | 6/2004 |
| FR | 8211463 A | 6/1982 |
| FR | 2529739 | 1/1984 |
| FR | 2891098 | 3/2007 |
| GB | 2207838 A | 2/1989 |
| GB | 2248955 A | 4/1992 |
| GB | 2290204 A | 12/1995 |
| GB | 2365649 A | 2/2002 |
| GB | 2378345 | 2/2003 |
| GB | 2479164 A | 10/2011 |
| HK | 1134855 A1 | 10/2010 |
| HK | 1116323 A1 | 12/2010 |
| IE | 19913397 A1 | 4/1992 |
| IL | 99586 A | 2/1998 |
| IL | 215133 | 12/2011 |
| IL | 222829 | 12/2012 |
| IL | 222830 | 12/2012 |
| IL | 225525 | 6/2013 |
| IN | 180215 B | 1/1998 |
| IN | 200701744 P3 | 11/2007 |
| IN | 200900856 P3 | 5/2009 |
| IN | 200800214 P3 | 6/2009 |
| IS | 3759 A7 | 3/1992 |
| JP | 60-054324 A | 3/1985 |
| JP | 63-033988 | 2/1988 |
| JP | 63-263985 A | 10/1988 |
| JP | 2001-241993 A | 9/1989 |
| JP | 04-373286 A | 12/1992 |
| JP | 06-054324 A | 2/1994 |
| JP | 7015720 A | 1/1995 |
| JP | 7-160292 A | 6/1995 |
| JP | 7160292 A | 6/1995 |
| JP | 8095599 A | 4/1996 |
| JP | 8-265704 A | 10/1996 |
| JP | 8265704 A | 10/1996 |
| JP | 10-228437 A | 8/1998 |
| JP | 10-510131 | 9/1998 |
| JP | 11-134273 A | 5/1999 |
| JP | H11-261966 | 9/1999 |
| JP | 2000-152234 | 5/2000 |
| JP | 2001-145112 A | 5/2001 |
| JP | 2001-203995 A | 7/2001 |
| JP | 2001-245271 | 9/2001 |
| JP | 2001-245291 | 9/2001 |
| JP | 2001-514471 | 9/2001 |
| JP | 2002-016920 | 1/2002 |
| JP | 2002-057952 A | 2/2002 |
| JP | 2002-112220 A | 4/2002 |
| JP | 2002-141810 A | 5/2002 |
| JP | 2002-208027 | 7/2002 |
| JP | 2002-300556 A | 10/2002 |
| JP | 2002-319991 | 10/2002 |
| JP | 2003-506763 A | 2/2003 |
| JP | 2003-087673 | 3/2003 |
| JP | 2003-087785 | 3/2003 |
| JP | 2003-529234 | 9/2003 |
| JP | 2004-501445 A | 1/2004 |
| JP | 2004-056777 A | 2/2004 |
| JP | 2004-110850 | 4/2004 |
| JP | 2004-112441 | 4/2004 |
| JP | 2004-135932 A | 5/2004 |
| JP | 2004-264812 A | 9/2004 |
| JP | 2004-312283 | 11/2004 |
| JP | 2004-533736 A | 11/2004 |
| JP | 2004-536381 A | 12/2004 |
| JP | 2004-536681 | 12/2004 |
| JP | 2005-033741 | 2/2005 |
| JP | 2005-084987 A | 3/2005 |
| JP | 2005-095599 | 3/2005 |
| JP | 8-095599 A | 4/2005 |
| JP | 2005-123981 A | 5/2005 |
| JP | 2005-156996 | 6/2005 |
| JP | 2005-519382 | 6/2005 |
| JP | 2005-523479 A | 8/2005 |

(56) References Cited

FOREIGN PATENT DOCUMENTS

| | | |
|---|---|---|
| JP | 2005-260289 | 9/2005 |
| JP | 2005-309752 | 11/2005 |
| JP | 2006-067280 | 3/2006 |
| JP | 2006-512838 | 4/2006 |
| JP | 2006-246358 A | 9/2006 |
| JP | 2007-129296 | 5/2007 |
| JP | 2007-522727 | 8/2007 |
| JP | 11-88419 | 9/2007 |
| JP | 2007-264440 A | 10/2007 |
| JP | 2008-535622 A | 9/2008 |
| JP | 04252727 B2 | 4/2009 |
| JP | 2009-159188 A | 7/2009 |
| JP | 2009-543386 A | 12/2009 |
| JP | 2011-108155 A | 6/2011 |
| JP | 2012-080593 A | 4/2012 |
| JP | 04996603 B2 | 8/2012 |
| JP | 05121711 B2 | 1/2013 |
| JP | 53-004612 A | 10/2013 |
| JP | 05331008 B2 | 10/2013 |
| JP | 05405819 B2 | 2/2014 |
| KR | 10-2005-0001362 | 1/2005 |
| KR | 10-2005-0085827 | 8/2005 |
| KR | 2006067924 A | 6/2006 |
| KR | 10-2006-0095821 | 9/2006 |
| KR | 2007038111 A | 4/2007 |
| KR | 20080001298 A | 1/2008 |
| KR | 2008024189 A | 3/2008 |
| KR | 2010111739 A | 10/2010 |
| KR | 2010120187 A | 11/2010 |
| KR | 2010127240 A | 12/2010 |
| KR | 2011030640 A | 3/2011 |
| KR | 2011129477 A | 12/2011 |
| KR | 20120112683 A | 10/2012 |
| KR | 2013061149 A | 6/2013 |
| KR | 2013113925 A | 10/2013 |
| KR | 1333200 B1 | 11/2013 |
| KR | 2008045154 A | 11/2013 |
| KR | 2013138263 A | 12/2013 |
| NL | 1032594 C2 | 4/2008 |
| NL | 1033929 C1 | 4/2008 |
| NL | 2004670 A | 11/2011 |
| NL | 2004780 A | 1/2012 |
| NZ | 239969 A | 12/1994 |
| PT | 99110 A | 12/1993 |
| WO | WO 1982002303 A1 | 7/1982 |
| WO | WO 1989008967 A1 | 9/1989 |
| WO | WO 90/13972 A1 | 11/1990 |
| WO | WO 93/22877 A2 | 11/1993 |
| WO | WO 1994016534 A2 | 7/1994 |
| WO | WO 1994019910 A1 | 9/1994 |
| WO | WO 1994021079 A1 | 9/1994 |
| WO | WO 95/15658 A1 | 6/1995 |
| WO | WO 1995032587 A1 | 11/1995 |
| WO | WO 1995033342 A1 | 12/1995 |
| WO | WO 1996014712 A1 | 5/1996 |
| WO | WO 1996027843 A1 | 9/1996 |
| WO | WO 1996031826 A1 | 10/1996 |
| WO | WO 1996037074 A2 | 11/1996 |
| WO | WO 1996042168 A1 | 12/1996 |
| WO | WO 1997016925 A1 | 5/1997 |
| WO | WO 1997033434 A1 | 9/1997 |
| WO | WO 1997039583 A1 | 10/1997 |
| WO | WO 1998026595 A1 | 6/1998 |
| WO | WO 99/00735 A1 | 1/1999 |
| WO | WO 99/04568 | 1/1999 |
| WO | WO 1999000735 A1 | 1/1999 |
| WO | WO 1999030496 A1 | 6/1999 |
| WO | WO 1999030497 A1 | 6/1999 |
| WO | WO 1999030500 A1 | 6/1999 |
| WO | WO 1999030501 A1 | 6/1999 |
| WO | WO 1999035840 A1 | 7/1999 |
| WO | WO 1999041911 A1 | 8/1999 |
| WO | WO 1999056468 A1 | 11/1999 |
| WO | WO 99/65232 A1 | 12/1999 |
| WO | WO 99/65243 A1 | 12/1999 |
| WO | WO 1999066732 A1 | 12/1999 |
| WO | WO 2000002303 A1 | 1/2000 |
| WO | WO 00/07372 A1 | 2/2000 |
| WO | WO 00/08967 A1 | 2/2000 |
| WO | WO 00/19910 A1 | 4/2000 |
| WO | WO 00/38430 A1 | 6/2000 |
| WO | WO 00/41397 A1 | 7/2000 |
| WO | WO 01/39494 A1 | 5/2001 |
| WO | WO 01/41447 A1 | 6/2001 |
| WO | WO01/56293 A1 | 8/2001 |
| WO | WO 01/82614 A1 | 11/2001 |
| WO | WO 01/92973 | 12/2001 |
| WO | WO 02/089487 A2 | 7/2002 |
| WO | WO 02/076097 A1 | 9/2002 |
| WO | WO 02/076099 A1 | 9/2002 |
| WO | WO 03/026232 A1 | 3/2003 |
| WO | WO 03/026275 A2 | 3/2003 |
| WO | WO 03/047710 A2 | 6/2003 |
| WO | WO 03/065683 A1 | 8/2003 |
| WO | WO 03/071727 A2 | 8/2003 |
| WO | WO 03/091832 A2 | 11/2003 |
| WO | WO 2004/012437 A2 | 2/2004 |
| WO | WO 2004/018060 A2 | 3/2004 |
| WO | WO2004/057609 A1 | 7/2004 |
| WO | WO 2004/073310 A2 | 8/2004 |
| WO | WO 2005/002215 A1 | 1/2005 |
| WO | WO 2005/041122 A2 | 5/2005 |
| WO | WO 2005/053301 A2 | 6/2005 |
| WO | WO 2005/076575 | 8/2005 |
| WO | WO 05/120067 A2 | 12/2005 |
| WO | WO 2006/014362 A1 | 2/2006 |
| WO | WO 2006/022881 A1 | 3/2006 |
| WO | WO 2006/053305 | 5/2006 |
| WO | WO 2006/067697 A2 | 6/2006 |
| WO | WO 2006/081634 A2 | 8/2006 |
| WO | WO 2006/105480 | 10/2006 |
| WO | WO 2006/110268 A1 | 10/2006 |
| WO | WO 2007/001797 A1 | 1/2007 |
| WO | WO 2007/008319 A1 | 1/2007 |
| WO | WO 2007/008355 A2 | 1/2007 |
| WO | WO 2007/008356 A1 | 1/2007 |
| WO | WO 2007/008357 A1 | 1/2007 |
| WO | WO 2007/008358 A1 | 1/2007 |
| WO | WO 2007/018722 A2 | 2/2007 |
| WO | WO 2007/018726 A2 | 2/2007 |
| WO | WO2008/044916 A2 | 4/2008 |
| WO | WO 2008/044916 A2 | 4/2008 |
| WO | WO 2008/086170 A1 | 7/2008 |
| WO | WO 2008/088741 A2 | 7/2008 |
| WO | WO 2008/088752 A2 | 7/2008 |
| WO | WO 2008/088772 A2 | 7/2008 |
| WO | WO 2008/100205 A1 | 8/2008 |
| WO | WO 2009/038596 A1 | 3/2009 |
| WO | WO2009/038596 A1 | 3/2009 |
| WO | WO 2009/099893 A1 | 8/2009 |
| WO | WO 2009/099895 A1 | 8/2009 |
| WO | WO 2009/105465 A2 | 8/2009 |
| WO | WO 2009/110897 A1 | 9/2009 |
| WO | WO 2009/114247 A2 | 9/2009 |
| WO | WO 2009/155214 A2 | 12/2009 |
| WO | WO 2010/044926 A3 | 4/2010 |
| WO | WO 2010/054136 A1 | 5/2010 |
| WO | WO 2010/107954 A2 | 9/2010 |
| WO | WO 2011/014336 A1 | 9/2010 |
| WO | WO 2011/082364 A2 | 7/2011 |
| WO | WO 2011/139155 A1 | 11/2011 |
| WO | WO 2011/149357 A1 | 12/2011 |
| WO | WO 2012/051528 A2 | 4/2012 |
| WO | WO 2012/138660 | 10/2012 |
| WO | WO 2012/138660 A2 | 10/2012 |
| WO | WO 2013/106390 A1 | 7/2013 |
| WO | WO 2013/155310 A1 | 7/2013 |
| WO | WO 2013/184604 A1 | 12/2013 |
| WO | WO2013/184604 A1 | 12/2013 |

OTHER PUBLICATIONS

ActiveVideo Networks BV, International Preliminary Report on

(56) References Cited

OTHER PUBLICATIONS

Patentability, PCT/NL2011/050308, dated Sep. 6, 2011, 8 pgs.
ActiveVideo Networks BV, International Search Report and Written Opinion, PCT/NL2011/050308, dated Sep. 6, 2011, 8 pgs.
Activevideo Networks Inc., International Preliminary Report on Patentability, PCT/US2011/056355, dated Apr. 16, 2013, 4 pgs.
ActiveVideo Networks Inc., International Preliminary Report on Patentability, PCT/US2012/032010, dated Oct. 8, 2013, 4 pgs.
ActiveVideo Networks Inc., International Search Report and Written Opinion, PCT/US2011/056355, dated Apr. 13, 2012, 6 pgs.
ActiveVideo Networks Inc., International Search Report and Written Opinion, PCT/US2012/032010, dated Oct. 10, 2012, 6 pgs.
ActiveVideo Networks Inc., International Search Report and Written Opinion, PCT/US2013/036182, dated Jul. 29, 2013, 12 pgs.
ActiveVideo Networks, Inc., International Search Report and Written Opinion, PCT/US2009/032457, dated Jul. 22, 2009, 7 pgs.
ActiveVideo Networks Inc., Extended EP Search Rpt, Application No. 09820936-4, 11 pgs.
ActiveVideo Networks Inc., Extended EP Search Rpt, Application No. 10754084-1, 11 pgs.
ActiveVideo Networks Inc., Extended EP Search Rpt, Application No. 10841764.3, 16 pgs.
ActiveVideo Networks Inc., Extended EP Search Rpt, Application No. 11833486.1, 6 pgs.
AcitveVideo Networks Inc., Korean Intellectual Property Office, International Search Report; PCT/US2009/032457, dated Jul. 22, 2009, 7 pgs.
Annex C—Video buffering verifier, information technology—generic coding of moving pictures and associated audio information: video, Feb. 2000, 6 pgs.
Antonoff, Michael, "Interactive Television," Popular Science, Nov. 1992, 12 pages.
Avinity Systems B.V., Extended European Search Report, Application No. 12163713.6, 10 pgs.
Avinity Systems B.V., Extended European Search Report, Application No. 12163712-8, 10 pgs.
Benjelloun, A summation algorithm for MPEG-1 coded audio signals: a first step towards audio processed domain, 2000, 9 pgs.
Broadhead, Direct manipulation of MPEG compressed digital audio, Nov. 5-9, 1995, 41 pgs.
Cable Television Laboratories, Inc., "CableLabs Asset Distribution Interface Specification, Version 1.1", May 5, 2006, 33 pgs.
CD 11172-3, Coding of moving pictures and associated audio for digital storage media at up to about 1.5 MBIT, Jan. 1, 1992, 39 pgs.
Craig, Notice of Allowance, U.S. Appl. No. 11/178,176, dated Dec. 23, 2010, 8 pgs.
Craig, Notice of Allowance, U.S. Appl. No. 11/178,183, dated Jan. 12, 2012, 7 pgs.
Craig, Notice of Allowance, U.S. Appl. No. 11/178,183, dated Jul. 19, 2012, 8 pgs.
Craig, Notice of Allowance, U.S. Appl. No. 11/178,189, dated Oct. 12, 2011, 7 pgs.
Craig, Notice of Allowance, U.S. Appl. No. 11/178,176, dated Mar. 23, 2011, 8 pgs.
Craig, Notice of Allowance, U.S. Appl. No. 13/609,183, dated Aug. 26, 2013, 8 pgs.
Craig, Final Office Action, U.S. Appl. No. 11/103,838, dated Feb. 5, 2009, 30 pgs.
Craig, Final Office Action, U.S. Appl. No. 11/178,181, dated Aug. 25, 2010, 17 pgs.
Craig, Final Office Action, U.S. Appl. No. 11/103,838, dated Jul. 6, 2010, 35 pgs.
Craig, Final Office Action, U.S. Appl. No. 11/178,176, dated Oct. 1, 2010, 8 pgs.
Craig, Final Office Action, U.S. Appl. No. 11/178,183, dated Apr. 13, 2011, 16 pgs.
Craig, Final Office Action, U.S. Appl. No. 11/178,177, dated Oct. 26, 2010, 12 pgs.
Craig, Final Office Action, U.S. Appl. No. 11/178,181, dated Jun. 20, 2011, 21 pgs.
Craig, Office Action, U.S. Appl. No. 11/103,838, dated May 12, 2009, 32 pgs.
Craig, Office Action, U.S. Appl. No. 11/103,838, dated Aug. 19, 2008, 17 pgs.
Craig, Office Action, U.S. Appl. No. 11/103,838, dated Nov. 19, 2009, 34 pgs.
Craig, Office Action, U.S. Appl. No. 11/178,176, dated May 6, 2010, 7 pgs.
Craig, Office-Action U.S. Appl. No. 11/178,177, dated Mar. 29, 2011, 15 pgs.
Craig, Office Action, U.S. Appl. No. 11/178,177, dated Aug. 3, 2011, 26 pgs.
Craig, Office Action, U.S. Appl. No. 11/178,177, dated Mar. 29, 2010, 11 pgs.
Craig, Office Action, U.S. Appl. No. 11/178,181, dated Feb. 11, 2011, 19 pgs.
Craig, Office Action, U.S. Appl. No. 11/178,181, dated Mar. 29, 2010, 10 pgs.
Craig, Office Action, U.S. Appl. No. 11/178,182, dated Feb. 23, 2010, 15 pgs.
Craig, Office Action, U.S. Appl. No. 11/178,183, dated Dec. 6, 2010, 12 pgs.
Craig, Office Action, U.S. Appl. No. 11/178,183, dated Sep. 15, 2011, 12 pgs.
Craig, Office Action, U.S. Appl. No. 11/178,183, dated Feb. 19, 2010, 17 pgs.
Craig, Office Action, U.S. Appl. No. 11/178,183, dated Jul. 20, 2010, 13 pgs.
Craig, Office Action, U.S. Appl. No. 11/178,189, dated Nov. 9, 2010, 13 pgs.
Craig, Office Action, U.S. Appl. No. 11/178,189, dated Mar. 15, 2010, 11 pgs.
Craig, Office Action, U.S. Appl. No. 11/178,189, dated Jul. 23, 2009, 10 pgs.
Craig, Office Action, U.S. Appl. No. 11/178,189, dated May 26, 2011, 14 pgs.
Craig, Office Action, U.S. Appl. No. 13/609,183, dated May 9, 2013, 7 pgs.
Pavlovskaia, Office Action, JP 2011-516499, dated Feb. 14, 2014, 19 pgs.
Digital Audio Compression Standard(AC-3, E-AC-3), Advanced Television Systems Committee, Jun. 14, 2005, 236 pgs.
European Patent Office, Extended European Search Report for International Application No. PCT/US2010/027724, dated Jul. 24, 2012, 11 pages.
FFMPEG, http://www.ffmpeg.org, downloaded Apr. 8, 2010, 8 pgs.
FFMEG-0.4.9 Audio Layer 2 Tables Including Fixed Psycho Acoustic Model, 2001, 2 pgs.
Herr, Notice of Allowance, U.S. Appl. No. 11/620,593, dated May 23, 2012, 5 pgs.
Herr, Notice of Allowance, U.S. Appl. No. 12/534,016, dated Feb. 7, 2012, 5 pgs.
Herr, Notice of Allowance, U.S. Appl. No. 12/534,016, dated Sep. 28, 2011, 15 pgs.
Herr, Final Office Action, U.S. Appl. No. 11/620,593, dated Sep. 15, 2011, 104 pgs.
Herr, Office Action, U.S. Appl. No. 11/620,593, dated Mar. 19, 2010, 58 pgs.
Herr, Office Action, U.S. Appl. No. 11/620,593, dated Apr. 21, 2009 27 pgs.
Herr, Office Action, U.S. Appl. No. 11/620,593, dated Dec. 23, 2009, 58 pgs.
Herr, Office Action, U.S. Appl. No. 11/620,593, dated Jan. 24, 2011, 96 pgs.
Herr, Office Action, U.S. Appl. No. 11/620,593, dated Aug. 27, 2010, 41 pgs.
Herre, Thoughts on an SAOC Architecture, Oct. 2006, 9 pgs.
Hoarty, The Smart Headend—A Novel Approach to Interactive Television, Montreux Int'l TV Symposium, Jun. 9, 1995, 21 pgs.
ICTV, Inc., International Preliminary Report on Patentability, PCT/US2006/022585, dated Jan. 29, 2008, 9 pgs.
ICTV, Inc., International Search Report / Written Opinion, PCT/US2006/022585, dated Oct. 12, 2007, 15 pgs.

(56) References Cited

OTHER PUBLICATIONS

ICTV, Inc., International Search Report / Written Opinion, PCT/US2008/000419, dated May 15, 2009, 20 pgs.
ICTV, Inc., International Search Report / Written Opinion; PCT/US2006/022533, dated Nov. 20, 2006; 8 pgs.
Isovic, Timing constraints of MPEG-2 decoding for high quality video: misconceptions and realistic assumptions, Jul. 2-4, 2003, 10 pgs.
MPEG-2 Video elementary stream supplemental information, Dec. 1999, 12 pgs.
Ozer, Video Compositing 101. available from http://www.emedialive.com, Jun. 2, 2004, 5pgs.
Porter, Compositing Digital Images, 18 Computer Graphics (No. 3), Jul. 1984, pp. 253-259.
RSS Advisory Board, "RSS 2.0 Specification", published Oct. 15, 2007. Not Found.
SAOC use cases, draft requirements and architecture, Oct. 2006, 16 pgs.
Sigmon, Final Office Action, U.S. Appl. No. 11/258,602, dated Feb. 23, 2009, 15 pgs.
Sigmon, Office Action, U.S. Appl. No. 11/258,602, dated Sep. 2, 2008, 12 pgs.
Tag Networks, Inc., Communication pursuant to Article 94(3) EPC, European Patent Application, 06773714.8, dated May 6, 2009, 3 pgs.
Tag Networks Inc, Decision to Grant a Patent, JP 209-544985, dated Jun. 28, 2013, 1 pg.
Tag Networks Inc., IPRP, PCT/US2006/010080, dated Oct. 16, 2007, 6 pgs.
Tag Networks Inc., IPRP, PCT/US2006/024194, dated Jan. 10, 2008, 7 pgs.
Tag Networks Inc., IPRP, PCT/US2006/024195, dated Apr. 1, 2009, 11 pgs.
Tag Networks Inc., IPRP, PCT/US2006/024196, dated Jan. 10, 2008, 6 pgs.
Tag Networks Inc., International Search Report, PCT/US2008/050221, dated Jun. 12, 2008, 9 pgs.
Tag Networks Inc., Office Action, CN 200680017662.3, dated Apr. 26, 2010, 4 pgs.
Tag Networks Inc., Office Action, EP 06739032.8, dated Aug. 14, 2009, 4 pgs.
Tag Networks Inc., Office Action, EP 06773714.8, dated May 6, 2009, 3 pgs.
Tag Networks Inc., Office Action, EP 06773714.8, dated Jan. 12, 2010, 4 pgs.
Tag Networks Inc., Office Action, JP 2008-506474, dated Oct. 1, 2012, 5 pgs.
Tag Networks Inc., Office Action, JP 2008-506474, dated Aug. 8, 2011, 5 pgs.
Tag Networks Inc., Office Action, JP 2008-520254, dated Oct. 20, 2011, 2 pgs.
Tag Networks, IPRP, PCT/US2008/050221, dated Jul. 7, 2009, 6 pgs.
Tag Networks, International Search Report, PCT/US2010/041133, dated Oct. 19, 2010, 13 pgs.
Tag Networks, Office Action, CN 200880001325.4, dated Jun. 22, 2011, 4 pgs.
Tag Networks, Office Action, JP 2009-544985, dated Feb. 25, 2013, 3 pgs.
Talley, A general framework for continuous media transmission control, Oct. 13-16, 1997, 10 pgs.
The Toolame Project, Psych_nl.c, 1999, 1 pg.
Todd, AC-3: flexible perceptual coding for audio transmission and storage, Feb. 26-Mar. 1, 1994, 16 pgs.
Tudor, MPEG-2 Video Compression, Dec. 1995, 15 pgs.
TVHEAD, Inc., First Examination Report, IN 1744/MUMNP/2007, dated Dec. 30, 2013, 6 pgs.
TVHEAD, Inc., International Search Report, PCT/US2006/010080, dated Jun. 20, 2006, 3 pgs.
TVHEAD, Inc., International Search Report, PCT/US2006/024194, dated Dec. 15, 2006, 4 pgs.
TVHEAD, Inc., International Search Report, PCT/US2006/024195, dated Nov. 29, 2006, 9 pgs.
TVHEAD, Inc., International Search Report, PCT/US2006/024196, dated Dec. 11, 2006, 4 pgs.
TVHEAD, Inc., International Search Report, PCT/US2006/024197, dated Nov. 28, 2006, 9 pgs.
Vernon, Dolby digital: audio coding for digital television and storage applications, Aug. 1999, 18 pgs.
Wang, A beat-pattern based error concealment scheme for music delivery with burst packet loss, Aug. 22-25, 2001, 4 pgs.
Wang, A compressed domain beat detector using MP3 audio bitstream, Sep. 30-Oct. 5, 2001, 9 pgs.
Wang, A multichannel audio coding algorithm for inter-channel redundancy removal, May 12-15, 2001, 6 pgs.
Wang, An excitation level based psychoacoustic model for audio compression, Oct. 30-Nov. 4, 1999, 4 pgs.
Wang, Energy compaction property of the MDCT in comparison with other transforms, Sep. 22-25, 2000, 23 pgs.
Wang, Exploiting excess masking for audio compression, Sep. 2-5, 1999, 4 pgs.
Wang, schemes for re-compressing mp3 audio bitstreams, Nov. 30-Dec. 3, 2001, 5 pgs.
Wang, Selected advances in audio compression and compressed domain processing, Aug. 2001, 68 pgs.
Wang, The impact of the relationship between MDCT and DFT on audio compression, Dec. 13-15, 2000, 9 pgs.
ActiveVideo, http://www.activevideo.com/, as printed out in year 2012, 1 pg.
ActiveVideo Networks Inc., International Preliminary Report on Patentability, PCT/US2013/020769, dated Jul. 24, 2014, 6 pgs.
ActiveVideo Networks Inc., International Search Report and Written Opinion, PCT/US2014/030773, dated Jul. 25, 2014, 8 pgs.
ActiveVideo Networks Inc., International Search Report and Written Opinion, PCT/US2014/041416, dated Aug. 27, 2014, 8 pgs.
ActiveVideo Networks Inc., Extended EP Search Rpt, Application No. 13168509.1, 10 pgs.
ActiveVideo Networks Inc., Extended EP Search Rpt, Application No. 13168376-5, 8 pgs.
ActiveVideo Networks Inc., Extended EP Search Rpt, Application No. 12767642-7, 12 pgs.
ActiveVideo Networks Inc., Communication Pursuant to Rules 70(2) and 70a(2), EP10841764.3, dated Jun. 6, 2014, 1 pg.
ActiveVideo Networks Inc., Communication Pursuant to Article 94(3) EPC, EP08713106.6-1908, dated Jun. 26, 2014, 5 pgs.
ActiveVideo Networks Inc., Communication Pursuant to Article 94(3) EPC, EP08713106.6-2223, dated May 10, 2011, 7 pgs.
ActiveVideo Networks Inc., Communication Pursuant to Article 94(3) EPC, EP09713486.0, dated Apr. 14, 2014, 6 pgS.
ActiveVideo Networks Inc., Examination Report No. 1, AU2011258972, dated Apr. 4, 2013, 5 pgs.
ActiveVideo Networks Inc., Examination Report No. 1, AU2010339376, dated Apr. 30, 2014, 4 pgs.
ActiveVideo Networks Inc., Examination Report, App. No. EP11749946.7, dated Oct. 8, 2013, 6 pgs.
ActiveVideo Networks Inc., Summons to attend oral-proceeding, Application No. EP09820936-4, dated Aug. 19, 2014, 4 pgs.
ActiveVideo Networks Inc., International Searching Authority, International Search Report—International application No. PCT/US2010/027724, dated Oct. 28, 2010, together with the Written Opinion of the International Searching Authority, 7 pages.
Adams, Jerry, NTZ Nachrichtechnische Zeitschrift. vol. 40, No. 7, Jul. 1987, Berlin DE pp. 534-536; Jerry Adams: 'Glasfasernetz fur Breitbanddienste in London', 5 pgs. No English Translation Found.
Avinity Systems B.V., Communication pursuant to Article 94(3) EPC, EP 07834561.8, dated Jan. 31, 2014, 10 pgs.
Avinity Systems B.V., Communication pursuaht to Article 94(3) EPC, EP 07834561.8, dated Apr. 8, 2010, 5 pgs.
Avinity Systems B.V., International Preliminary Report on Patentability, PCT/NL2007/000245, dated Mar. 31, 2009, 12 pgs.
Avinity Systems B.V., International Search Report and Written Opinion, PCT/NL2007/000245, dated Feb. 19, 2009, 18 pgs.

(56) References Cited

OTHER PUBLICATIONS

Avinity Systems B.V., Notice of Grounds of Rejection for Patent, JP 2009-530298, dated Sep. 3, 2013, 4 pgs.
Avinity Systems B.V., Notice of Grounds of Rejection for Patent, JP 2009-530298, dated Sep. 25, 2012, 6 pgs.
Bird et al., "Customer Access to Broadband Services," ISSLS 86—The International Symposium on Subrscriber Loops and Services Sep. 29, 1986, Tokyo,JP 6 pgs.
Brockmann, Final Office Action, U.S. Appl. No. 13/668,004, dated Jul. 16, 2014, 20 pgs.
Brockmann, Final Office Action, U.S. Appl. No. 13/438,617, dated Oct. 3, 2014, 19 pgs.
Brockmann, Office Action, U.S. Appl. No. 13/686,548, dated Mar. 10, 2014, 11 pgs.
Brockmann, Office Action, U.S. Appl. No. 13/668,004, dated Dec. 23, 2013, 9 pgs.
Brockmann, Office Action, U.S. Appl. No. 13/438,617, dated May 12, 2014, 17 pgs.
Brockmann, Final Office Action, U.S. Appl. No. 12/443,571, dated Mar. 7, 2014, 21 pgs.
Brockmann, Office Action, U.S. Appl. No. 12/443,571, dated Jun. 5, 2013, 18 pgs.
Chang, Shih-Fu, et al., "Manipulation and Compositing of MC-DOT Compressed Video, " IEEE Journal on Selected Areas of Communications, Jan. 1995, vol. 13, No. 1, 11 pgs. Best Copy Available.
Dahlby, Office Action, U.S. Appl. No. 12/651,203, dated Jun. 5, 2014, 18 pgs.
Dahlby, Final Office Action, U.S. Appl. No. 12/651,203, dated Feb. 4, 2013, 18 pgs.
Dahlby, Office Action, U.S. Appl. No. 12/651,203, dated Aug. 16, 2012, 18 pgs.
Dukes, Stephen D., "Photonics for cable television system design, Migrating to regional hubs and passive networks," Communications Engineering and Design, May 1992, 4 pgs.
Ellis, et al., "INDAX: An Operation Interactive Cabletext System", IEEE Journal on Selected Areas in Communications, vol. sac-1, No. 2, Feb. 1983, pp. 285-294.
European Patent Office, Supplementary European Search Report, Application No. EP 09 70 8211, dated Jan. 5, 2011, 6 pgs.
Frezza, W., "The Broadband Solution—Metropolitan CATV Networks," Proceedings of Videotex '84, Apr. 1984, 15 pgs.
Gecsei, J., "Topology of Videotex Networks," The Architecture of Videotex Systems, Chapter 6, 1983 by Prentice-Hall, Inc.
Gobl, et al., "ARIDEM—a multi-service broadband access demonstrator," Ericsson Review No. 3, 1996, 7 pgs.
Gordon, Notice of Allowance, U.S. Appl. No. 12/008,697, dated Mar. 20, 2014, 10 pgs.
Gordon, Final Office Action, U.S. Appl. No. 12/008,722, dated Mar. 30, 2012, 16 pgs.
Gordon, Final Office Action, U.S. Appl. No. 12/035,236, dated Jun. 11, 2014, 14 pgs.
Gordon, Final Office Action, U.S. Appl. No. 12/035,236, dated Jul. 22, 2013, 7 pgs.
Gordon, Final Office Action, U.S. Appl. No. 12/035,236, dated Sep. 20, 2011, 8 pgs.
Gordon, Final Office Action, U.S. Appl. No. 12/035,236, dated Sep. 21, 2012, 9 pgs.
Gordon, Final Office Action, U.S. Appl. No. 12/008,697, dated Mar. 6, 2012, 48 pgs.
Gordon, Office Action, U.S. Appl. No. 12/035,236, dated Mar. 13, 2013, 9 pgs.
Gordon, Office Action, U.S. Appl. No. 12/035,236, dated Mar. 22, 2011, 8 pgs.
Gordon, Office Action, U.S. Appl. No. 12/035,236, dated Mar. 28, 2012, 8 pgs.
Gordon, Office Action, U.S. Appl. No. 12/035,236, dated Dec. 16, 2013, 11 pgs.
Gordon, Office Action, U.S. Appl. No. 12/008,697, dated Aug. 1, 2013, 43 pgs.
Gordon, Office Action, U.S. Appl. No. 12/008,697, dated Aug. 4, 2011, 39 pgs.
Gordon, Office Action, U.S. Appl. No. 12/008,722, dated Oct. 11, 2011, 16 pgs.
Handley et al, "TCP Congestion Window Validation," RFC 2861, Jun. 2000, Network Working Group, 22 pgs.
Henry et al. "Multidimensional Icons" ACM Transactions on Graphics, vol. 9, No. 1 Jan. 1990, 5 pgs.
Insight advertisement, "In two years this is going to be the most watched program on TV" On touch VCR programming, published not later than 2000, 10 pgs.
Isensee et al., "Focus Highlight for World Wide Web Frames," Nov. 1, 1997, IBM Technical Disclosure Bulletin, vol. 40, No. 11, pp. 89-90.
ICTV, Inc., International Search Report / Written Opinion, PCT/US2008/000400, dated Jul. 14, 2009, 10 pgs.
ICTV, Inc., International Search Report / Written Opinion, PCT/US2008/000450, dated Jan. 26, 2009, 9 pgs.
Kato, Y., et al., "A Coding Control algorithm for Motion Picture Coding Accomplishing Optimal Assignment of Coding Distortion to Time and Space Domains," Electronics and Communications in Japan, Part 1, vol. 72, No. 9, 1989, 11 pgs.
Koenen, Rob,"MPEG-4 Overview—Overview of the MPEG-4 Standard" Internet Citation, Mar. 2001 (Mar. 2001), http://mpeq.telecomitalialab.com/standards/mpeg-4/mpeg-4.htm, May 9, 2002, 74 pgs.
Konaka, M. et al., "Development of Sleeper Cabin Cold Storage Type Cooling System," SAE International, The Engineering Society for Advancing Mobility Land Sea Air and Space, SAE 2000 World Congress, Detroit, Michigan, Mar. 6-9, 2000, 7 pgs.
Le Gall, Didier, "MPEG: A Video Compression Standard for Multimedia Applications", Communication of the ACM, vol. 34, No. 4, Apr. 1991, New York, NY, 13 pgs.
Langenberg, E, et al., "Integrating Entertainment and Voice on the Cable Network," SCTE , Conference on Emerging Technologies, Jan. 6-7, 1993, New Orleans, Louisiana, 9 pgs.
Large, D., "Tapped Fiber vs. Fiber-Reinforced Coaxial CATV Systems", IEEE LCS Magazine, Feb. 1990, 7 pgs. Best Copy Available.
Mesiya, M.F, "A Passive Optical/Coax Hybrid Network Architecture for Delivery of CATV, Telephony and Data Services," 1993 NCTA Technical Papers, 7 pgs.
"MSDL Specification Version 1.1" International Organisation for Standardisation Organisation Internationale EE Normalisation, ISO/IEC JTC1/SC29/WG11 Coding of Moving Pictures and Autdio, N1246, MPEG96/Mar. 1996, 101 pgs.
Noguchi, Yoshihiro, et al., "MPEG Video Compositing in the Compressed Domain," IEEE International Symposium on Circuits and Systems, vol. 2, May 1, 1996, 4 pgs.
Regis, Notice of Allowance U.S. Appl. No. 13/273,803, dated Sep. 2, 2014, 8 pgs.
Regis, Notice of Allowance U.S. Appl. No. 13/273,803, dated May 14, 2014, 8 pgs.
Regis, Final Office Action U.S. Appl. No. 13/273,803, dated Oct. 11, 2013, 23 pgs.
Regis, Office Action U.S. Appl. No. 13/273,803, dated Mar. 27, 2013, 32 pgs.
Richardson, Ian E.G., "H.264 and MPEG-4 Video Compression, Video Coding for Next-Genertion Multimedia," Johm Wiley & Sons, US, 2003, ISBN: 0-470-84837-5, pp. 103-105, 149-152, and 164.
Rose, K., "Design of a Switched Broad-Band Communications Network for Interactive Services," IEEE Transactions on Communications, vol. com-23, No. 1, Jan. 1975, 7 pgs.
Saadawi, Tarek N., "Distributed Switching for Data Transmission over Two-Way CATV", IEEE Journal on Selected Areas in Communications, vol. Sac-3, No. 2, Mar. 1985, 7 pgs.
Schrock, "Proposal for a Hub Controlled Cable Television System Using Optical Fiber," IEEE Transactions on Cable Television, vol. CATV-4, No. 2, Apr. 1979, 8 pgs.
Sigmon, Notice of Allowance, U.S. Appl. No. 13/311,203, dated Sep. 22, 2014, 5 pgs.

(56) References Cited

OTHER PUBLICATIONS

Sigmon, Notice of Allowance, U.S. Appl. No. 13/311,203, dated Feb. 27, 2014, 14 pgs.
Sigmon, Final Office Action, U.S. Appl. No. 13/311,203, dated Sep. 13, 2013, 20 pgs.
Sigmon, Office Action, U.S. Appl. No. 13/311,203, dated May 10, 2013, 21 pgs.
Smith, Brian C., et al., "Algorithms for Manipulating Compressed Images," IEEE Computer Graphics and Applications, vol. 13, No. 5, Sep. 1, 1993, 9 pgs.
Smith, J. et al., "Transcoding Internet Content for Heterogeneous Client Devices" Circuits and Systems, 1998. ISCAS '98. Proceedings of the 1998 IEEE International Symposium on Monterey, CA, USA May 31-Jun. 3, 1998, New York, NY, USA,IEEE, US, May 31, 1998 (May 31, 1998), 4 pgs.
Stoll, G. et al., "GMF4iTV: Neue Wege zur-lnteraktivitaet Mit Bewegten Objekten Beim Digitalen Fernsehen," Fkt Fernseh Und Kinotechnik, Fachverlag Schiele & Schon GmbH, Berlin, DE, vol. 60, No. 4, Jan. 1, 2006, ISSN: 1430-9947, 9 pgs. No English Translation Found.
Tamitani et al., "An Encoder/Decoder Chip Set for the MPEG Video Standard," 1992 IEEE International Conference on Acoustics, vol. 5, Mar. 1992, San Francisco, CA, 4 pgs.
Terry, Jack, "Alternative Technologies and Delivery Systems for Broadband ISDN Access", IEEE Communications Magazine, Aug. 1992, 7 pgs.
Thompson, Jack, "DTMF-TV, The Most Economical Approach to Interactive TV," GNOSTECH Incorporated, NCF'95 Session T-38-C, 8 pgs.
Thompson, John W. Jr., "The Awakening 3.0: PCs, TSBs, or DTMF-TV—Which Telecomputer Architecture is Right for the Next Generations's Public Network?," Gnostech Incorporated, 1995 The National Academy of Sciences, downloaded from the Unpredictable Certainty: White Papers, http://www.nap.edu/catalog/6062.html, pp. 546-552.
Tobagi, Fouad A., "Multiaccess Protocols in Packet Communication Systems," IEEE Transactions on Communications, vol. Com-28, No. 4, Apr. 1980, 21 pgs.
Toms, N., "An Integrated Network Using Fiber Optics (Info) for the Distribution of Video, Data, and Telephone in Rural Areas," IEEE Transactions on Communication, vol. Com-26, No. 7, Jul. 1978, 9 pgs.
Trott, A., et al."An Enhanced Cost Effective Line Shuffle Scrambling System with Secure Conditional Access Authorization," 1993 NCTA Technical Papers, 11 pgs.
Jurgen_Two-way applications for cable television systems in the '70s, IEEE Spectrum, Nov. 1971, 16 pgs.
va Beek, P., "Delay-Constrained Rate Adaptation for Robust Video Transmission over Home Networks," Image Processing, 2005, ICIP 2005, IEEE International Conference, Sep. 2005, vol. 2, No. 11, 4 pgs.
Van der Star, Jack A. M., "Video on Demand Without Compression: A Review of the Business Model, Regulations and Future Implication," Proceedings of PTC'93, 15th Annual Conference, 12 pgs.
Welzenbach et al., "The Application of Optical Systems for Cable TV," AEG-Telefunken, Backnang, Federal Republic of Germany, ISSLS Sep. 15-19, 1980, Proceedings IEEE Cat. No. 80 CH1565-1, 7 pgs.
Yum, TS P., "Hierarchical Distribution of Video with Dynamic Port Allocation," IEEE Transactions on Communications, vol. 39, No. 8, Aug. 1, 1991, XP000264287, 7 pgs.
ActiveVideo Networks, Inc., International Search Report and Written Opinion, PCT/US2013/020769, dated May 9, 2013, 9 pgs.
ActiveVideo Networks, Inc., International Preliminary Report on Patentablity, PCT/US2013/036182, dated Oct. 14, 2014, 9 pgs.
ActiveVideo Networks Inc., Communication Pursuant to Rule 94(3), EP08713106-6, dated Jun. 25, 2014, 5 pgs.
ActiveVideo Networks Inc., Communication Pursuant to Rules 161(2) & 162 EPC, EP13775121.0, dated Jun. 20, 2015, 3 pgs.

ActiveVideo Networks Inc., Examination Report No. 1, AU2011258972, dated Jul. 21, 2014, 3 pgs.
ActiveVideo Networks Inc., Certificate of Patent JP5675765, dated Jan. 9, 2015, 3 pgs.
Brockmann, Notice of Allowance, U.S. Appl. No. 13/445,104, dated Dec. 24, 2014, 14 pgs.
Brockmann, Office Action, U.S. Appl. No. 13/668,004, dated Feb. 26, 2015, 17 pgs.
Brockmann, Office Action, U.S. Appl. No. 13/686,548, dated Jan. 5, 2015, 12 pgs.
Brockmann, Office Action, U.S. Appl. No. 13/911,948, dated Dec. 26, 2014, 12 pgs.
Brockmann, Office Action, U.S. Appl. No. 13/911,948, dated Jan. 29, 2015, 11 pgs.
Dahlby, Office Action, U.S. Appl. No. 12/651,203, dated Dec. 3, 2014, 19 pgs.
Gordon, Notice of Allowance, U.S. Appl. No. 12/008,697, dated Dec. 8, 2014, 10 pgs.
Gordon, Office Action, U.S. Appl. No. 12/008,722, dated Nov. 28, 2014, 18 pgs.
Regis, Notice of Allowance, U.S. Appl. No. 13/273,803, dated Nov. 18, 2014, 9 pgs.
Regis, Notice of Allowance, U.S. Appl. No. 13/273,803, dated Mar. 2, 2015, 8 pgs.
Sigmon, Notice of Allowance, U.S. Appl. No. 13/311,203, dated Dec. 19, 2014, 5 pgs.
TAG Networks Inc, Decision to Grant a Patent, JP 2008-506474, dated Oct. 4, 2013, 5 pgs.
ActiveVideo Networks, Inc., International Search Report and Written Opinion, PCT/US2014/041430, dated Oct. 9, 2014, 9 pgs.
ActiveVideo, International Search Report and Written Opinion, PCT/US2015/027803, dated Jun. 24, 2015, 18 pgs.
ActiveVideo, International Search Report and Written Opinion, PCT/US2015/027804, dated Jun. 25, 2015, 10 pgs.
ActiveVideo Networks Inc., Communication Pursuant to Rule 94(3), EP09713486.0, dated Apr. 14, 2014, 6 pgs.
ActiveVideo Networks Inc., Communication Pursuant to Rules 70(2) and 70a(2), EP11833486.1, dated Apr. 24, 2014, 1 pg.
ActiveVideo Networks Inc., Communication Pursuant to Article 94(3) EPC, 10754084.1, dated Feb. 10, 2015, 12 pgs.
ActiveVideo Networks Inc., Communication under Rule 71(3) EPC, Intention to Grant, EP08713106.6, dated Feb. 19, 2015, 12 pgs.
ActiveVideo Networks Inc., Decision to refuse a European patent application (Art. 97(2) EPC, EP09820936.4, dated Feb. 20, 2015, 4 pgs.
ActiveVideo Networks Inc., Examination Report No. 2, AU2011249132, dated May 29, 2015, 4 pgs.
Activevideo Networks Inc., Examination Report No. 2, AU2011315950, dated Jun. 25, 2015, 3 pgs.
ActiveVideo Networks B.V., Office Action, IL222830, dated Jun. 28, 2015, 7 pgs.
ActiveVideo Networks, Inc., Office Action, JP2013534034, dated Jun. 16, 2015, 6 pgs.
Active Video Networks, Notice of Reasons for Rejection, JP2012-547318, dated Sep. 26, 2014, 7 pgs.
ActiveVideo Networks Inc., Notice of Reasons for Rejection, JP2014-100460, dated Jan. 15, 2015, 6 pgs.
ActiveVideo Networks Inc., Notice of Reasons for Rejection, JP2013-509016, dated Dec. 24, 2014, 11 pgs.
Avinity Systems B. V., Final Office Action, JP-2009-530298, dated Oct. 7, 2014, 8 pgs.
Avinity-Systems-BV, PreTrial-Reexam-Report-JP2009530298, dated Apr. 24, 2015, 6 pgs.
Brockmann, Notice of Allowance, U.S. Appl. No. 14/298,796, dated Mar. 18, 2015, 11 pgs.
Brockmann, Notice of Allowance, U.S. Appl. No. 13/911,948, dated Jul. 10, 2015, 5 pgs.
Brockmann, Notice of Allowance, U.S. Appl. No. 13/438,617, dated May 22, 2015, 18 pgs.
Brockmann, Notice of Allowance, U.S. Appl. No. 13/445,104, dated Apr. 23, 2015, 8 pgs.
Brockmann, Final Office Action, U.S. Appl. No. 13/686,548, dated Sep. 24, 2014, 13 pgs.

(56) References Cited

OTHER PUBLICATIONS

Brockmann, Final Office Action, U.S. Appl. No. 12/443,571, dated Jul. 9, 2015, 28 pgs.
Brockmann, Office Action, U.S. Appl. No. 12/443,571, dated Nov. 5, 2014, 26 pgs.
Brockmann, Office Action, U.S. Appl. No. 13/737,097, dated Mar. 16, 2015, 18 pgs.
Brockmann, Office Action, U.S. Appl. No. 14/262,674, dated May 21, 2015, 7 pgs.
Craig, Decision on Appeal—Reversed—, U.S. Appl. No. 11/178,177, dated Feb. 25, 2015, 7 pgs.
Craig, Notice of Allowance, U.S. Appl. No. 11/178,177, dated Mar. 5, 2015, 7 pgs.
Craig, Notice of Allowance, U.S. Appl. No. 11/178,181, dated Feb. 13, 2015, 8 pgs.
Dahlby, Office Action U.S. Appl. No. 12/651,203, dated Jul. 2, 2015, 25 pgs.
Gecsei, J., "Adaptation in Distributed Multimedia Systems," IEEE Multimedia, IEEE Service Center, New York, NY, vol. 4, No. 2, Apr. 1, 1997, 10 pgs.
Gordon, Notice of Allowance, U.S. Appl. No. 12/008,697, dated Apr. 1, 2015, 10 pgs.
Gordon, Final Office Action, U.S. Appl. No. 12/008,722, dated Jul. 2, 2015, 20 pgs.
Ohta, K., et al., "Selective Multimedia Access Protocol for Wireless Multimedia Communication," Communications, Computers and Signal Processing, 1997, IEEE Pacific Rim Conference NCE Victoria, BC, Canada, Aug. 1997, vol. 1, 4 pgs.
Sigmon, Notice of Allowance, U.S. Appl. No. 13/311,203, dated Apr. 14, 2015. 5 pgs.
Wei, S., "QoS Tradeoffs Using an Application-Oriented Transport Protocol (AOTP) for Multimedia Applications Over IP." Sep. 23-26, 1999, Proceedings of the Third International Conference. on Computational Intelligence and Multimedia Applications, New Delhi, India, 5 pgs.
ActiveVideo Networks, Inc., Certificate of Grant, EP08713106.6-1908, dated Aug. 5, 2015, 2 pgs.
ActiveVideo Networks, Inc., Certificate of Grant, AU2011258972, dated Nov. 19, 2015, 2 pgs.
ActiveVideo Networks, Inc., Certificate of Grant, AU2011315950, dated Dec. 17, 2015, 2 pgs.
ActiveVideo Networks, Inc., Certificate of Grant EP13168509.11908, dated Sep. 30, 2015, 2 pgs.
ActiveVideo Networks, Inc., Communication Pursuant to Rules 161(1) and 162 EPC, EP14722897.7, dated Oct. 28, 2015, 2 pgs.
ActiveVideo Networks, Inc., Decision to Grant, EP08713106.6-1908, dated Jul. 9, 2015, 2 pgs.
ActiveVideo Networks, Inc., Decision to Grant, EP13168509.1-1908, dated Sep. 3, 2015, 2 pgs.
ActiveVideo Networks, Inc., Decision to Grant, JP2014100460, dated Jul. 24, 2015, 5 pgs.
ActiveVideo Networks, Inc., Decision to Refuse a European Patent Application, EP08705578.6, dated Nov. 26, 2015, 10 pgs.
ActiveVideo Networks, Inc., Extended European Search Report, EP13735906.3, dated Nov. 11, 2015, 10 pgs.
ActiveVideo Networks, Inc., KIPO's Notice of Preliminary Rejection, KR10-2010-7019512, dated Jul. 15, 2015, 15 pgs.
ActiveVideo Networks, Inc., KIPO's Notice of Preliminary Rejection, KR10-20107021116, dated Jul. 13, 2015, 19 pgs.
ActiveVideo Networks, Inc., International Search Report and Written Opinion, PCT-US2015028072, dated Aug. 7, 2015, 9 pgs.
ActiveVideo Networks, Inc., International Preliminary Report on Patentability, PCT-US2014030773, dated Sep. 15, 2015, 6 pgs.
ActiveVideo Networks, Inc., International Preliminary Report on Patentability, PCT/US2014041430, dated Dec. 8, 2015, 6 pgs.
ActiveVideo Networks, Inc., International Preliminary Report on Patentability, PCT-US2014041416, dated Dec. 8, 2015, 6 pgs.
ActiveVideo, Communication Pursuant to Article-94(3) EPC, EP12767642.7, dated Sep. 4, 2015, 4 pgs.

AcriveVideo, Communication Pursuant to Article 94(3) EPC, EP10841764.3, dated Dec. 18, 2015, 6 pgs.
ActiveVideo Networks, Inc., Communication Pursuant to Rules 70(2) abd 70a(2) EP13735906.3, dated Nov. 27, 2015, 1 pg.
ActiveVideo, Notice of Reasons for Rejection, JP2013-509016, dated Dec. 3, 2015, 7 pgs.
Brockmann, Notice of Allowance, U.S. Appl. No. 14/262,674, dated Sep. 30, 2015, 7 pgs.
Brockmann, Notice of Allowance, U.S. Appl. No. 13/911,948, dated Aug. 21, 2015, 6 pgs.
Brockmann, Notice of Allowance, U.S. Appl. No. 13/911,948, dated Aug. 5, 2015, 5 pgs.
Brockmann, Final Office Action, U.S. Appl. No. 13/668,004, dated Aug. 3, 2015, 18 pgs.
Brockmann, Final Office Action, U.S. Appl. No. 13/686,548, dated Aug. 12, 2015, 13 pgs.
Brockmann, Office Action, U.S. Appl. No. 14/298,796, dated Sep. 11, 2015, 11 pgs.
Brockmann, Office Action, U.S. Appl. No. 12/443,571, dated Dec. 4, 2015, 30 pgs.
Dahlby, Final Office Action, U.S. Appl. No. 12/651,203, dated Dec. 11, 2015, 25 pgs.
Jacob, Bruce, "Memory Systems: Cache, DRAM, Disk," The Cache Layer, Chapter 22, p. 739.
ActiveVideo Networks, Inc., Certificate of Grant, HK10102800.4, dated Jun. 10, 2016, 3 pgs.
ActiveVideo Networks, Inc., Communication Pursuant to Article 94(3) EPC, ER14722897.7, dated Jun. 29, 2016, 6 pgs. ,.
ActiveVideo Networks, Inc., Communication Pursuant to Article 94(3) EPC, EP11738835.5, dated Jun. 10, 2016, 3 pgs.
ActiveVideo Networks, Inc., Partial Supplementary Extended European Search Report, EP13775121.0, dated Jun. 14, 2016, 7 pgs.
Brockmann, Final Office Action, U.S. Appl. No. 12/443,571 dated Aug. 1, 2016, 32 pgs.
ActiveVideo Networks, Inc., Certificate of Patent, IL215133, dated Mar. 31, 2016, 1 pg.
ActiveVideo Networks, Inc., Certificate of Grant, HK14101604, dated Sep. 8, 2016, 4 pgs.
ActiveVideo Networks, Inc. Notice of Reasons for Rejection, JP2015-159309, dated Aug. 29, 2016. 11 pgs.
ActiveVideo Networks, Inc. Denial of Entry of Amendment, JP2013-509016, dated Aug. 30, 2016, 7 pgs.
ActiveVideo Networks, Inc., International Search Report and Written Opinion, PCT/US2016/040547, dated Sep. 19, 2016, 6 pgs.
ActiveVideo Networks, Inc., Communication Pursuant to Article 94(3), EP13735906.3, dated Jul. 18, 2016, 5 pgs.
Hoeben, Office Action, U.S. Appl. No. 14/757,935, dated Sep. 23, 2016, 28 pgs.
ActiveVideo Networks, Inc., Certificate of Grant, AU2011249132, dated Jan. 7, 2016, 2 pgs.
ActiveVideo Networks, Inc., Certificate of Patent, JP2013534034, dated Jan. 8, 2016, 4 pgs.
ActiveVideo Networks, Inc., Communication Pursuant to Rules 161(1) and 162 EPC, EP14740004.8, dated Jan. 26, 2016, 2 pgs.
ActiveVideo Networks, Inc., Communication Pursuant to Rules 161(1) and 162 EPC, EP14736535.7, dated Jan. 26, 2016, 2 pgs.
ActiveVideo Networks, Inc., KIPO's 2nd-Notice of Preliminary Rejection, KR10-2010-7019512, dated Feb. 12, 2016, 5 pgs.
ActiveVideo Networks, Inc., KIPO's Notice of Preliminary Rejection, KR10-2011-7024417, dated Feb. 18, 2016, 16 pgs.
ActiveVideo Networks, Inc., International Search Report and Written Opinion, PCT/US2015/000502, dated May 6, 2016, 8 pgs.
ActiveVideo, Notice of German Patent, EP602008040474-9, dated Jan. 6, 2016, 4 pgs.
Avinity Systems B.V., Notice of Grant-JP2009530298, dated Apr. 12, 2016, 3 pgs.
Brockmann, Office Action, U.S. Appl. No. 13/668,004, dated Mar. 25, 2016, 17 pgs.
Brockmann, Office Action, U.S. Appl. No. 13/686,548, dated Feb. 8, 2016, 13 pgs.
Brockmann, Final Office Action, U.S. Appl. No. 13/737,097, dated Aug. 14, 2015, 17 pgs.

(56) References Cited

OTHER PUBLICATIONS

Brockmann, Notice of Alowance, U.S. Appl. No. 14/298,796, dated Mar. 17, 2016, 9 pgs.
Gordon, Notice of Allowance, U.S. Appl. No. 12/008,722, dated Feb. 17, 2016, 10 pgs.
McElhatten, Office Action, U.S. Appl. No. 14/698,633, dated Feb. 22, 2016, 14 pgs.
ActiveVideo Networks, Inc., Communication Under Rule 71(3), Intention to Grant, EP11833486.1, dated Apr. 21, 2017, 7 pgs.
ActiveVideo Networks, Inc., Decision to Refuse an EP Patent Application, EP 10754084.1, dated Nov. 3, 2016, 4 pgs.
ActiveVideo Networks, Inc. Notice of Final Rejection, JP2013-509016, dated Aug. 30, 2016, 3 pgs.
ActiveVideo Networks, Inc., KIPO's Notice of Preliminary Rejection, KR10-2012-7031648, dated Mar. 27, 2017, 3 pgs.
ActiveVideo Networks, Inc., International Preliminary Report on Patentability, PCT-US2015028072, dated Nov. 1, 2016, 7 pgs.
ActiveVideo Networks, Inc., International Preliminary Report on Patentability, PCT-US2015/027803, dated Oct. 25, 2016, 8 pgs.
ActiveVideo Networks, Inc., International Preliminary Report on Patentability, PCT-US2015/027804, dated Oct. 25, 2016, 6 pgs.
ActiveVideo Networks, Inc., International Search Report and Written Opinion, PCT/US2016/051283, dated Nov. 29, 2016, 10 pgs.
ActiveVideo, Summons to attend oral proceedings, EP12767642.7, Apr. 7, 2016, 5 pgs.
ActiveVideo, Intent to Grant, EP12767642.7, dated Jan. 2, 2017, 15 pgs.
Avinity Systems B.V., Decision to Refuse an EP Patent Application, EP07834561.8, dated Oct. 10, 2016, 17 pgs.
Brockmann, Final Office Action, U.S. Appl. No. 13/668,004, dated Nov. 2, 2016, 20 pgs.
Brockmann, Office Action, U.S. Appl. No. 13/668,004, dated Mar. 31, 2017, 21 pgs. Mar. 31, 2017.
Brockmann, Office Action, U.S. Appl. No. 14/217,108, dated Apr. 13, 2016, 8 pgs.
Brockmann, Office Action, U.S. Appl. No. 14/696,462, dated Feb. 8, 2017, 6 pgs.
Brockmann, Office Action, U.S. Appl. No. 15/139,166, dated Feb. 28, 2017, 10 pgs.
Brockmann, Final Office Action, U.S. Appl. No. 14/217,108, dated Dec. 1, 2016, 9 pgs.
Brockmann, Office Action, U.S. Appl. No. 12/443,571, dated May 31, 2017, 36 pgs.
Dahlby, Advisory Action, U.S. Appl. No. 12/651,203, dated Nov. 21, 2016, 5 pgs.
Hoeben, Office Action, U.S. Appl. No. 14/757,935, dated Apr. 12, 2017, 29 pgs.
McElhatten, Final Office Action, U.S. Appl. No. 14/698,633, Aug. 18, 2016, 16 pgs.
McElhatten, Office Action, U.S. Appl. No. 14/698,633, dated Feb. 10, 2017, 15 pgs.
ActiveVideo Networks, Inc., Decision to grant an European Patent, EP12767642.7, dated May 11, 2017, 2 pgs.
ActiveVideo Networks, Inc., Decision to Grant an European Patent, EP06772771.9, dated Oct. 26, 2017, 2 pgs.
ActiveVideo Networks, Inc., Certficate of Grant, EP06772771.9, Nov. 22, 2017, 1 pg.
ActiveVideo Networks, Inc., Decision to grant an European Patent, EP11833486.1, dated Oct. 26, 2017, 2 pgs.
ActiveVideo Networks, Inc., Certificate of Grant, EP11833486.1, Nov. 22, 2017, 1 pg.
ActiveVideo Networks, Inc., Transmission of Certificate of Grant, EP12767642-7, Jun. 7, 2017, 1 pg.
ActiveVideo Networks, Inc., Certificate of Grant, EP12767642-7, Jun. 7, 2017, 1 pg.
ActiveVideo Networks, Inc., Intention to Grant, EP06772771.9, dated Jun. 12, 2017, 5 pgs.
ActiveVideo Networks, Inc., Communication Pursuant to Article 94(3), EP14722897.7, dated Jul. 19, 2017, 7 pgs.
ActiveVideo Networks, Inc., Communication Pursuant to Article 94(3), EP14740004.8, dated Aug. 24, 2017, 7 pgs.
ActiveVideo Networks, Inc., Communication Pursuant to Article 94(3), EP15721482.6, dated Nov. 20, 2017, 7 pgs.
ActiveVideo Networks, Inc., Communication Pursuant to Rules 161(2) and 162,EP16818840.7, dated Feb. 20, 2018, 3 pgs.
ActiveVideo Networks, Inc., Extended European Search Report, EP15785776.4, dated Aug. 18, 2017, 8 pgs.
ActiveVideo Networks, Inc., Extended European Search Report, EP15873840.1, dated May 18, 2018, 9 pgs.
ActiveVideo Networks, Inc., Communication Pursuant to Rules 70(2) and 70a(2), EP15873840.1, dated Jun. 6, 2018, 1 pg.
ActiveVideo Networks, Inc., Notification of German Patent, DE602012033235.2, dated Jun. 13, 2017, 3 pgs.
ActiveVideo Networks, Inc., International Preliminary Report on Patentability, PCT/US2016/040547, dated Jan. 2, 2018, 5 pgs.
ActiveVideo Networks, Inc., International Search Report and Written Opinion, PCT/US2016/064972, dated Feb. 17, 2017, 9 pgs.
ActiveVideo Networks, Inc., International Preliminary Report on Patentability, PCT/US2016/064972, dated Jun. 14, 2018, 7 pgs.
ActiveVideo Networks, Inc., International Search Report and Written Opinion, PCT/US2017/068293, dated Mar. 19, 2018, 7 pgs.
Brockmann, Notice of Allowance, U.S. Appl. No. 14/696,462, dated Jul. 21, 2017, 6 pgs.
Brockmann, Office Action, U.S. Appl. No. 14/217,108, dated Aug. 10, 2017, 14 pgs.
Brockmann, Office Action, U.S. Appl. No. 15/139,166, dated Nov. 22, 2017, 9 pgs.
Brockmann, Office Action, U.S. Appl. No. 15/199,503, dated Feb. 7, 2018, 12 pgs.
Brockmann, Office Action, U.S. Appl. No. 15/261,791, dated Feb. 21, 2018, 26 pgs.
Hoeben, Final Office Action, U.S. Appl. No. 14/757,935, dated Feb. 28, 2018, 33 pgs.
Visscher, Office Action, U.S. Appl. No. 15/368,527, dated Feb. 23, 2018, 23 pgs.
ActiveVideo Networks, Inc., Communication Pursuant to Rules 161(1) and 162 EPC, EP15785776.4, dated Dec. 8, 2016, 2 pgs.
ActiveVideo Networks, Inc., Communication Pursuant to Rules 161(1) and 162 EPC, EP15721482.6, dated Dec. 13, 2016, 2 pgs.
ActiveVideo Networks, Inc., Communication Pursuant to Rules 161(1) and 162 EPC, EP15721483.4, dated Dec. 15, 2016, 2 pgs.
ActiveVideo Networks, Inc., Communication Pursuant to Article 94(3), EP15721483.4, dated Dec. 10, 2018, 5 pgs.
ActiveVideo Networks, Inc., Communication Pursuant to Rules 70(2) and 70a(2), EP16845261.3, dated Jan. 18, 2019, 1 pg.
ActiveVideo Networks, Inc., Extended European Search Report, EP16818840.7, dated Nov. 30, 2018, 5 pgs.
Brockmann, Office Action, U.S. Appl. No. 12/443,571, dated May 21, 2017, 36 pgs.
Brockmann, Office Action, U.S. Appl. No. 15/728,430, dated Jul. 27, 2018, 6 pgs.
Brockmann, Notice of Allowance, U.S. Appl. No. 15/139,166, dated Oct. 1, 2018, 7 pgs.
Brockmann, Office Action, U.S. Appl. No. 15/791,198, dated Dec. 21, 2018, 18 pgs.
Brockmann, Final Office Action, U.S. Appl. No. 15/791,198, dated Apr. 25, 2019, 22 pgs.
Brockmann, Notice of Allowance, U.S. Appl. No. 15/199,503, dated Aug. 16, 2018, 13 pgs.
Brockmann, Notice of Allowance, U.S. Appl. No. 15/199,503, dated Dec. 12, 2018, 9 pgs.
Brockmann, Final Office Action, U.S. Appl. No. 15/261,791, dated Oct. 16, 2018, 17 pgs.
Hoeben, Office Action, U.S. Appl. No. 14/757,935, dated Jun. 28, 2018, 37 pgs.
Hoeben, Office Action, U.S. Appl. No. 15/851,589, dated Sep. 21, 2018, 19 pgs.
Hoeben, Notice of Allowance, U.S. Appl. No. 14/757,935, dated Jan. 28, 2019, 9 pgs.
Ohta et al., "Selective multimedia access protocol for wireless multimedia communication," Communications, Computeres and Signal Processing, 1997, 10 Yeas PACRIM 1987-1997—

(56) References Cited

OTHER PUBLICATIONS

Networking the Pacific RIM. 1997 IEEE Pacific RIM Conference NCE on Victoria, BC, Canada Aug. 20-22, 1997, New York, NY, USA, IEEE, US, vol. 1, Aug. 20, 1997 (Aug. 20, 1997), pp. 81-84, XP010244922, DOI:10.1109/PACRIM. 1997.619907, ISBN:978-0-7803-3905-7.
Visscher, Final Office Action, U.S. Appl. No. 15/368,527, dated Sep. 11, 2018, 25 pgs.
Visscher, Office Action, U.S. Appl. No. 15/368,527, 11S dated Feb. 1, 2019, 29 pgs.

* cited by examiner

RENDERING OF AN INTERACTIVE LEAN-BACKWARD USER INTERFACE ON A TELEVISION

PRIORITY CLAIM

The present U.S. Patent Application claims priority from U.S. Provisional Patent Application 61/584,538 filed on Jan. 9, 2012 entitled "Rendering of an Interactive Lean-Backward User Interface on a Television", which is incorporated herein by reference in its entirety.

TECHNICAL FIELD

The present invention relates to user interfaces and systems for creating user interfaces, and more particularly to a user interface and system for creation in real-time with personalized interactive content.

BACKGROUND ART

When content is interacted with in a computer environment, the user interacts with a "lean forward" user interface. Such interfaces require the user to actively participate through keystrokes and mouse clicks. The user interface of interactive television services often consists of 'menu items' from which a user actively selects one (by navigating using up/down/left/right buttons, and then pressing 'ok' or a similar button to confirm his choice). The menu items are often nicely listed in a static 2D layout. The menu items typically lead, after a number of menus and selections, to trailers, synopsis data, video assets (Video on Demand) or a linear broadcast. This can be characterized as a 'lean forward' user experience, because the user is requested to actively make a choice before anything else happens. Often multiple user interactions are required before a preview of a content item is shown. If the user does not do anything, the screen remains the same except maybe some animated user interface elements on the screen.

When content is displayed in a television environment, the user generally wishes to have a "lean-back" experience with little interaction with a controller, but still desires to be entertained. This is even true of interactive content that is distributed through communication networks, such as cable television systems. The "lean forward" web browser, word processor, and other applications do not translate well to a television viewing experience. Thus, there is a need for a "lean-back" user interface that can be rendered in real-time and that provides for individualized user content.

It is known in the prior art, in computer-based systems to employ tiles that when moved over with a cursor provide a presentation view of the content. Currently, the presentation view is for static content (e.g. word processing documents, spreadsheets). The current version of Microsoft's Windows product includes such functionality.

Additionally, a company called Animoto provides for an animation rendering web service. Animoto accepts a set of movies and still pictures as assets, and renders an animation to present these assets. However, the end user cannot interact with the renderings.

SUMMARY OF THE EMBODIMENTS

Embodiments of the invention relate to user interfaces and systems and methods for generating a "lean-back" user interface for use with a television or other display device.

First, an interactive session is established between a client device associated with a user's television and the platform for creating the user interface over a communication network, such as a cable television network. The user interface is automatically generated by the platform and is animated even without interactions by the user with an input device. The user interface includes a plurality of interactive animated assets. The animated assets are capable of changing over time (e.g. different images, full-motion video) and are also capable of being animated so as to change screen position, rotate, move etc. over time. The interactive animated assets have an associated state. For example, an asset may be active or inactive.

After an interactive session has been established, the platform identifies a TV application to execute. The TV application determines a plurality of interactive animated assets to present to the user based upon a user profile. The user profile may indicate preferences of the user or may have historical information about the user's past actions (e.g. movie selections, television shows viewed etc.).

The TV application determines the state of each of the assets and determines the tiles that need to be generated. One tile can contain zero or more assets. To generate each tile, the application generates a tile creation request. The tile creation request includes animation scripting information or a reference thereto. The one or more tile creation requests are executed by the platform and result each in one MPEG fragment.

The platform stitches each video frame based on the TV application output with the plurality of interactive animated assets to form a sequence of encoded video frames. In certain embodiments of the invention, each tile creation request creates a hash value for the tile creation request and the hash value is added to a database of hash values that are stored in cached memory. Thus, prior to the execution of a tile creation request, the tile creation request is hashed and a comparison with the database of hash values is performed. If there is a match of the hash value, the cached tile asset in cache memory is retrieved and passed along so that the MPEG fragment can be stitched into a video frame. If the hash value does not match, the asset/tile is retrieved and processed prior to the MPEG fragment being output for stitching with other MPEG fragments to form a video frame.

The platform transmits the sequence of encoded video frames to the client device associated with the user.

The interactive animated asset may include a graphical component which is a tile that is smaller than an entire video frame. In an active state, the graphical component is represented as a full motion video (e.g. a program preview) and in an inactive state the graphical component may be a still image.

The scripting information associated with the tile creation request may cause the encoding or transcoding of an interactive animated asset. For example, the graphical component may be stored as a full-screen preview and the script will indicate the size of the tile for the graphical component of the user interface causing the graphical component to be resized to fit within the tile. In order to facilitate real-time creation and updating of the user interface, the assets may be pre-encoded. The assets may be formed in an encoded stitchable format so that the assets can be combined in the encoded domain. As a result, all of the assets need not be decoded, rendered and re-encoded in order to produce a sequence of streaming video frames. In an embodiment of the invention, the assets are pre-encoded as macroblock encoded elements for stitching in the encoded domain.

The TV application causes an asset to be represented as an active asset by some indicia (e.g. border, different color, brighter color etc.). The TV application will then periodically switch between assets making an inactive asset "active" and the active asset "inactive". A user viewing the user interface may interact with the user interface to control the script. For example, the user may slow down or speed up how frequently an asset becomes active. Additionally, a user may use an input device to interrupt the script and cause an asset to become "active". Once an asset is active, the user may interact with the asset. For example, the user may select the asset and cause the asset to be displayed as a full-motion full-screen preview as opposed to a full-motion tiled preview. The user may also cause the interactive asset to be stopped slowed down or sped up. This interactivity is limited to active assets. Thus, a user cannot interact with a tile to change the speed or stop the tile asset.

The platform may include a stitching module. The stitching module will stitch together the selected assets based upon a recommendation engine along with a selected graphical portion of a TV application output to form a video frame. The video frames will be updated and output on a regular basis to form an encoded video stream that is directed to the client device of the user for decoding and display. The stitched content may represent an encoded video frame in an encoded video frame sequence, such as an MPEG transport stream.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions

Figure 1:
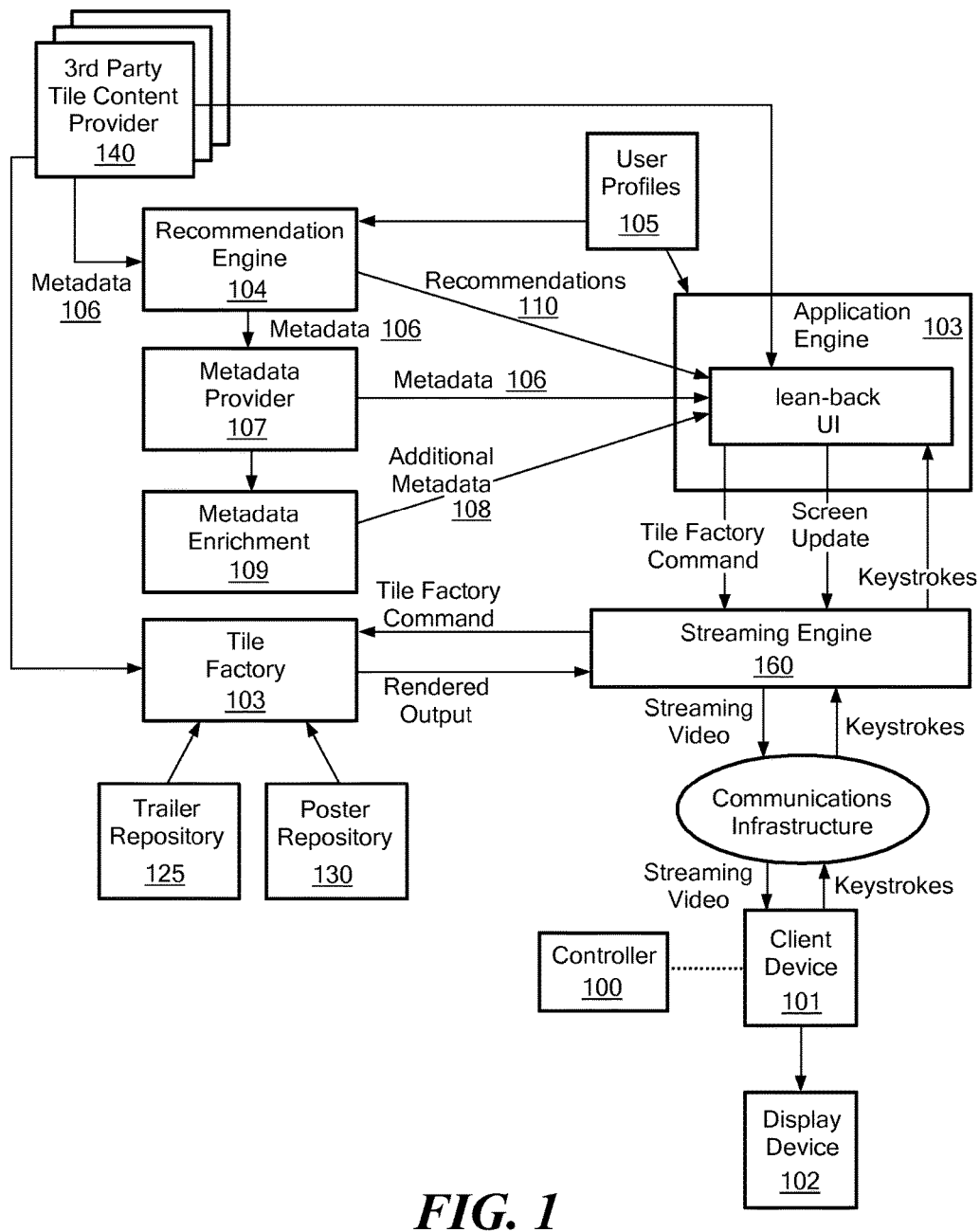
FIG. 1 is a schematic block diagram of a system for generating a real-time user interface that may be personalized for transmission of a compressed video stream through a communication network to a display device associated with a user.

As used in this description and the accompanying claims, the following terms shall have the meanings indicated, unless the context otherwise requires:

The term "animation" shall imply movement of an object such as an "asset" on a display device. The movement may be either within an asset (e.g. a full-motion video preview of source content) or the movement may be animation of the asset as a whole (e.g. a movie poster that is rotated, inverted, cut in smaller pieces that move apart and then re-joins, bounces etc. changing at least in part the addressable location on a display device).

The term "TV application" shall refer to a series of computer instructions and stored states that prescribe how the interactive TV application responds to stimuli such as keystrokes.

The term "asset" shall refer to a preview of a movie, TV program, photograph etc.; it can be a movie still or a full motion video or a thumbnail. Assets are associated with the underlying source content (complete movie, complete TV program, full-size photograph etc.).

The term "tile creation request" shall refer to a request issued by a TV application to a Tile Factory. The request includes references to source assets and/or previews thereof. The request may also include animation scripting information or a reference there to.

The term "tile" shall refer to one or more assets that are animated as specified in the tile creation request's animation script. The size of a tile is typically determined by the screen area required to render the animated asset(s). The animation can, for example, let the asset start as a small dot and progressively zoom in until it fills the area allocated for the tile. Each tile has associated functionality as defined by the TV application. For example, if a user selects a tile using an "input device" and the tile is in an "active" state, the user interface will change in response. The user interface may change to show the asset as a sequence of full video frames (e.g. a movie preview that fills the entire video display) or the user interface may include additional queries for the user, such as "do you wish to order this program?" Thus, tiles have associated "states". A tile may be an "active" tile wherein the tile can be accessed by the user using an input device. The tile may be an "inactive" tile displaying a still image, rotating set of images or an animation wherein the user cannot immediately interact with the tile. Once a tile is made "active", a user can then cause changes to the user interface and control the asset. For example an active tile may be presenting a full-motion preview of the asset within the tile. The user can then cause the preview to be displayed on the full screen. In addition, the user may be given control over the asset. The user may cause the asset to fast-forward, rewind, play or stop for example.

The term "TV application" is directed to a computer program that automatically causes a first tile to be designated as the "active" tile. Upon activation as the active tile, the tile may change its graphical representation from a still image to a full-motion video (e.g. a preview). The full motion video will generally be a reduced/scaled version of a preview. The TV application may be written so as to automatically switch between tiles by some triggering event or at a fixed or variable time. It can do so at any time, regardless of whether an animation has finished running or not. For example, tiles may be made active at 10 second intervals or upon completion of the preview (full motion video). When the TV application changes the "active" tile, the audio that is played may be changed correspondingly, where the audio of the now no longer active tile is muted. A tile may have video, (audible or muted) audio, textual descriptions, or a combination thereof. The TV application may specify to change the layout of the user interface over time, for example it may include an animation which removes one tile and re-arranges the remaining tiles. The tile that is removed may shrink until it disappears for example. The TV application will setup a tile creation request referring to the asset and an animation that reduces the size of the asset in time.

The "Tile Factory" will then render and compress the animation. The Tile Factory is a component of the platform for creating the user interface in real-time or parts thereof, and providing the user-interface as a compressed stream to a stitcher component, or directly to a decoder ("client device). The client device outputs the user interface to a display device. The Tile Factory component and the platform are explained in further detail below. In the present application, the term "real-time" refers to less than two seconds between a user's key press a change on the display device of the user as a result of the keypress.

The TV application may also have interactive functionality. For example, a user may control the rate of change between assets by pressing a 'fast forward' keystroke. As a result, the TV application reduces the playing time of each tile, and increases the pace of presenting tiles. The TV application may also reference user recommended assets and the asset's underlying source content. A tile will have associated graphical content (assets), a state, and functionality associated with the tile. Conceptually these are all part of the TV application. An asset may be associated with a movie, television program or may represent a list of programs (music, drama, mystery etc.) The tile will include a graphical image, series of graphical images or animation associated with an inactive state and a full-motion video sequence associated with an active state. The video sequence, which is full-motion may be a preview of a movie, video, game or television show. The underlying source content or source content shall refer to a full-screen version of a complete movie, complete television show or other entertainment form.

An "animation script" prescribes how certain input graphical or audio objects are modified over time. It also includes information on the background and other context of the graphical objects, for example to indicate that the background is filled with a colour or a texture.

The term "user" may refer to an individual ("John Doe") or may refer to a household (the "Smith" family) or other group that has access to a display device and accesses the lean-back user interface.

The term "encoded" shall refer to the process of compressing digital data and formatting the resultant data into a protocol form. For example, encoded data may be encoded using an MPEG protocol such as MPEG-1, MPEG-2, or MPEG-4 for example. Each of the MPEG standards specifies a compression mechanism and encapsulation in a format for transmission and decoding by a compatible decoder.

The term "object" shall refer to an encoded/unencoded asset or an encoded/unencoded TV application screen element or a combination thereof.

Figure 1A:
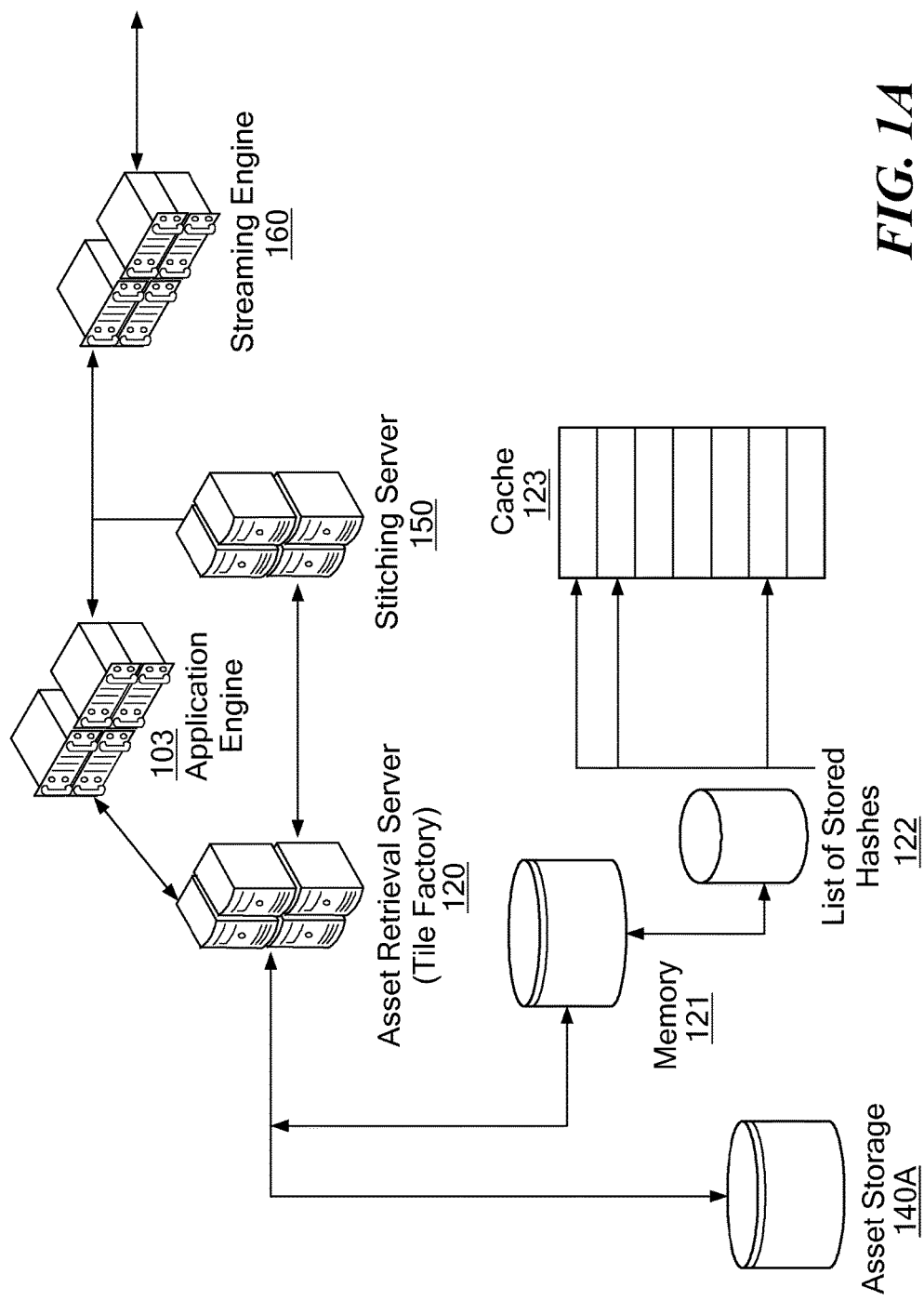
FIG. 1A is a schematic representation of system components for generating a real-time user interface including a list of stored hashes for MPEG fragment reuse.

FIGS. 1 and 1A show a platform for generation of a user interface. The user interface is transmitted across a communication network (e.g. Internet, cable television system etc.) to a display device of a user. The user interface is transmitted from the platform as a compressed video stream. In a preferred embodiment, the user interface is transmitted as a compressed stream wherein the user interface is personalized based upon information known about and collected from the user. All of the processing in the creation of the user interface is performed remote from the user's location by one or more remote processors. For example, the processing may be performed at a cable television head-end or at a location removed from a cable-television head-end i.e. a location in communication with the cable television head-end via a secondary network, such as the Internet. The user interacts with the remote processor using the display device itself (e.g. tablet PC) or a controller such as infrared remote control that is used to control the display device. The display device relays the controller instructions to the remote processor.

In the contemplated environment, the transmitted compressed video stream is received by a client device. The client device may be a set-top box, a television, tablet PC, or other device that is capable of decompressing the compressed unitary stream. For example, if the compressed unitary stream is encoded as an MPEG transport stream, the client device would include an MPEG decoder. In such a configuration, the client device needs only a small piece of client software to connect to the remote processor, transmit keys, and receive the user interface as MPEG audio/video stream ('streaming user interface'). It should be understood by one of ordinary skill in the art that the present invention is not limited to MPEG encoding and that other encoding schemes may also be employed without deviating from the intent of the invention.

In the present lean back user interface, 'menu items' are presented in the form of short trailers, animations, or stills ('previews') that are played out as tiles. Multiple tiles are presented consecutively and may be visible simultaneously (See for example FIGS. 3 and 4). The active asset (one of the tiles) launches without active user participation for a relatively short time—typically a few seconds or so, sufficient for the user to decide if he or she wants to explore the item some more (e.g. view a trailer or synopsis data). The tiles may be presented in a 3D representation and move around on the screen. Thus, each asset may be repositioned to a different addressable location on the screen. The asset may be represented in a three dimensional space with coordinates that are translated to the two-dimensional display space. The assets may be repositioned by a script (animation script) that becomes active when the user interface is presented on the display device of the user. Even if the user does not use an input device to select or interact with an asset, there are always visually attractive elements to draw the attention of the user that are continuously being refreshed. If the TV application decides that a tile should change from 'active' state to 'inactive' state, for example based on user input, it will stop the playout of the tile and/or replace it with the inactive representation of the tile. Thus, the TV application and the animation script associated with the tile creation request causes continuous and automatic updating of the assets displayed on the display device of the user.

The system as shown in FIG. 1 allows for real-time processing across a non-quality of service communication network, such as the Internet. Similarly, the system can be used with cable-television networks, satellite networks, and other networks in combination with the Internet in which there are data delays due to network bandwidth congestion. Real-time processing is achieved by caching reusable assets that may be applied across many different user interfaces or repeatedly used within a single user's interactive session. Additionally, all or portions of the objects that the TV application refers to may be cached. The reusable objects may be stored in a pre-compressed format, so that the encoded objects (assets and TV application screen elements) can be stitched together in the encoded domain rather than requiring that the objects are first spatially rendered, composited, and then compressed. In one embodiment, the objects may be stitchable MPEG macroblocks that have already been encoded using a frequency based and/or temporal transformation. An example of such an architecture for using stitchable content can be found in U.S. patent application Ser. No. 12/008,697 entitled "Interactive Encoded Content System including Object Models for Viewing on a Remote Device", which is incorporated herein by reference in its entirety. Because movement of the assets (direction and speed) is determined by an animation script associated with the TV application and the full-motion content of the video asset is known, the remote processor can determine which screen areas remain unmodified, which areas are unmodified, but include motion, (have associated motion vectors) and which screen elements need to be completely rendered and compressed in real-time. The platform components of FIG. 1 may use stitchable MPEG elements (transform encoded elements) or may use other elements that can be stitched together to form a compressed video stream.

As shown in FIG. 1 an Application Engine module 103 may operate to centrally control the creation of a lean-back user interface. It should be understood by one of ordinary skill in the art that each of the modules shown in FIG. 1 may be implemented as separate processors or integrated circuits, such as an ASIC, and may also include corresponding application code or the modules may be combined together and operate on a single processor. For example, the tile factory module and the streaming engine module may be combined together and the computer code for both the streaming engine module and the tile factory module may be implemented on a single processor. Similarly, the modules may be understood to represent functional computer code blocks. These computer code blocks can be implemented on a tangible computer readable medium and used in conjunction with one or more processors for creation of the lean-back user interface.

After an interactive session is established (i.e. through exchange of identification and addressing data) between a user using a controller 100 through a client device 101 coupled to a display device (e.g. a television) 102, the application engine 103 becomes active and the TV application is launched. Based upon the identity of the user, the recommendation engine 104 accesses a user profile 105. The user profile 105 maintains information about the user. For example, the user profile may include user preferences (favorite genres, actors, etc.) as well as containing historical information about the user. The historical information may include account information, including previously selected interactive content, and accessible content (e.g. does the user subscribe to a particular service?). Based upon a predetermined algorithm using the user's profile, the recommendation engine 104 accesses a database of available assets and provides the recommendations 110 to the application engine 103. One example of a recommendation engine is a product entitled Aprico. The product includes a set of algorithms that use different sources including user "clicks", time spent reviewing an asset, each time a user clicks an asset, or actual consumption of the source content in order to determine a recommendation (content to be displayed). The Aprico program maintains a database compiled of such personalized data for a user profile. Metadata associated with an asset can be used by the recommendation engine to determine if a user has a preference for an actor, director, genre or other property.

In addition to the recommendations provided by the recommendation engine, the application engine also receives metadata 106 from a metadata provider 107 along with metadata enrichment information 108 from a metadata enrichment module 109 and associated database. The metadata provider 107 may obtain and process information regarding a cable television's broadcast schedule, on demand offerings, and interactive features (such as games) and store the data in an associated database. For example, the metadata may include the title of the program/show/movie, the length of time of the source content, available viewing times for the source content if the source content is broadcast, principal actors, and a synopsis of the source content. The metadata provider 107 will then provide the metadata information 106 to the application engine 103 when requested.

The metadata enrichment module 109 adds metadata that is not traditionally present in current metadata databases but which can further personalize the ActiveTile asset (i.e. the tile and the associated asset). An example is selection of a movie that contains scenes where a favorite actor is appearing. The metadata enrichment module 109 may receive the metadata from the metadata provider 107 and associate enrichment data with the metadata. For example, the metadata enrichment module 109 may contain scene information for assets along with performers in the source content. Thus, a personalized experience can be created by the application engine 103. An ActiveTile asset can be created within the application engine for a preferred performer. Thus, all of the available programs/shows/movies (source content) that include the preferred performer may be accessible through this personalized ActiveTile asset that can be added to the lean-back user interface created within the application engine 103. The application engine 103 can use the additional metadata 111 to select a further personalized video trailer for the asset, for example by having the asset show a preview of the movie where the preferred performer is appearing when the asset is active.

The application engine 103, while executing the TV application, prepares one or more tile creation requests for the tile factory 120, specifying source assets and animation information. The assets are stored in a data store that may be part of or external to the platform, but which is in communication with the tile factory. The asset may include reference to trailers, posters, photographs, and synopsis information obtained from the metadata. The tile factory may access external data stores for accessing the graphical content associated with an asset. As shown, the tile factory would access full motion video content from a trailer repository 125 and access still image information from a poster repository 130 in response to a received command to create a tile that includes an asset. The asset may include tile content from third party tile content providers 140 such as YouTube or Flickr. The application engine, while executing the TV application, selects the assets to include in the command based on recommendations from the Recommendation Engine. In one embodiment of the invention, the command sent to the tile factory is formatted as an HTTP POST request to a URL, where the body of the request carries the command encoded in JSON.

The application engine passes the command URL to the Streaming Engine. The Streaming Engine issues the command to the tile factory which then accesses the animation information and the requested assets. The tile factory may perform a number of graphical processing functions on the graphical elements of the asset such as transcoding and resizing of the asset to fit within the TV application's screen layout at an addressable location. It may perform more advanced processing functions such as shading, slanting, or positioning the asset in a 3D coordinate system and then computing a 2D projection, or moving the asset in time along a 2D or 3D trajectory that is specified in the animation script. In certain embodiments, the tile factory may include elements for providing indicia of the asset being active. For example, the indicia may be a border that surrounds the addressable location of the asset when displayed. In certain embodiments, elements of an asset may be pre-encoded as MPEG fragments (macroblocks that have been transform encoded). After having rendered and compressed the animated asset, the tile factory passes the encoded representation of the asset to the streaming engine. The streaming engine stitches together, preferably in the encoded domain each of the graphical elements of the assets and the graphical elements of the TV application screen. The Streaming Engine generates a real-time compressed audio/video stream that is transmitted to the client device (over any suitable network infrastructure) which is then decoded (decompressed) by the client device and displayed on the user's display device. In a preferred embodiment, the tile factory uses information from an animation script associated with the tile creation request to efficiently encode MPEG. The tile factory may use information on speed and direction of the movements of animated assets as input for the motion prediction in an MPEG encoder, so as to create stitchable elements for the streaming engine.

The tile factory executes a tile creation request that references assets and an animation script, and renders it into MPEG. When the user interacts with the lean-back UI Application, the generation of the UI stream is affected. For example, the user can press a 'fast forward' button which increases the speed at which tiles are being presented to the user (where the playout of the tile content (e.g. movie trailers) stays at normal speed). The user can also navigate through the tiles if multiple tiles are shown on the display device. The selected tile is highlighted and put into an active state and may exhibit other audio/visual behavior than other ActiveTiles to attract attention. For example, the audio of the active asset is selected (others are muted), or the active asset is highlighted, surrounded with a border or made more colourful; or in general any other visual styling that attracts more attention than another visual styling.

An asset can include audio plus video, or only video, or only audio. An asset that has only audio can be understood as a 'voice over' that gives a vocal announcement of the tiles that are available for the user. The audio can be a pre-recorded human voice or computer-generated. The tile factory allows pre-encoding of certain asset elements prior to being used, as well as real-time (on-demand) rendering of animations. This allows the UI Application to dynamically adapt to personalized recommendation inputs while avoiding unnecessary re-rendering of previously rendered animations.

The tile creation request which is used as a command to the Tile Factory may in certain embodiments include:
  source movie or poster file
  path/address to an animation script, which uses a specification language such as Blender's
  startframe and endframe of the animation to render
  text to use in the animation
  graphical and audio context of the tile, such as screen background and background audio The Tile Factory includes a cache and logic to store results for consecutive requests. The tile factory calculates a hash over all animation parameters including source asset (by location, by file or location properties, or by the source asset hash) to detect whether the tile factory has rendered an animation for an earlier session, and if so, retrieves the animation from the cache.

Third party assets can be included in the user interface. A special type of third party ActiveTile asset is the user's own locally stored content, such as home movies and digitized DVDs. This third party asset may be stored in a database within or external to the platform. The database is in communication with the application engine and also with the tile factory. Thus, the application engine can specify a third party asset and communicate the information through the platform to the tile factory. The tile factory can then retrieve the third party asset from the database.

It should be recognized, that the user interface is updated on a regular basis and that the user interface is streamed as a compressed video stream to the client device. Thus, over time the user interface changes. For example, at least the active tile is updated in every video frame or nearly every video frame to produce full-motion video within the active tile. Additionally, the script from the tile creation request may cause movement to occur within the video frame, such that tiles appear to move between a first position within the video frame and a second position within the video frame.

To ensure scalability, objects such as unencoded assets, encoded assets, encoded and unencoded tiles and graphical TV application elements are cached and reused between users' sessions as shown in FIG. 1A. A streaming engine 160 receives requests for the creation of one or more user interfaces. The requests are passed to an application engine 103 that operates in conjunction with an asset retrieval server (tile factory) 120. The application engine 103 determines the tiles and underlying assets that need to be retrieved for the creation of each user interface and sends one or more tile creation requests to the tile factory 120. The asset retrieval server (Tile Factory) 120 calculates a "fingerprint" (using a hash function) of the source information that determination an object. For encoded and unencoded assets, the source information is the reference to the asset (e.g. file name or URL) and metadata that is available for that asset such as file date or information from HTTP headers for the URL, such as the last modified date. For encoded and unencoded tiles, the source information is a tile creation request. To determine whether an object is present in the cache 123, the tile factory 120 compares the fingerprint of the source information with a list of stored hashes in a hash database or linked list 122 stored in working memory 121. The list of stored hashes relates objects that are cached to the location within the cache. If the fingerprint matches an entry in the list of stored hashes 122, the tile factory 120 retrieves the stored object, thereby avoiding the need to generate the tile from the tile creation request or make an external request for the asset or recall a TV application graphical element. Specifically, the platform calculates a hash of the tile creation request to determine if the encoded version of a tile is present in the cache. The hash may include the location of all source assets, animation information, location and size information although other combinations of information can be used to create a unique hash value for objects including assets and tiles. If no match exists, the platform executes the tile creation request, and stores the MPEG encoded result (an MPEG fragment) along with the hash of the tile creation request in cached memory 123. Consecutive requests for the same tile will match the stored hash, and the platform will immediately retrieve the stored MPEG fragment.

In general the reused assets reference common content provided to a plurality of users in a user interface or previously used assets for a user's interactive session.

The list of stored hashes may be a linked list or a database and may contain tuples of (the object, the hash value for the object). The hash of the tile creation request or the unencoded/encoded asset is searched using common hash table techniques. In some implementations, the hash tables may include an array where the hash value is used as an array index. The elements in the array contain a linked list of objects that have the hash value. In other embodiments, a long hash value is used that substantially guarantees that only a single object is associated with the hash value. In such a configuration, an array is not preferred and a linked list containing (hash value, object) tuples is preferred. The linked list uses a binary tree as index into the list. The position in the linked list of a certain has value is then obtained by performing a binary search. Alternatively, the linked list elements could be stored on a disk where the hash value is used as part of the file name. The computer operating system would perform a lookup of the hash value onto a file location on disk (e.g. an object with a hash value 2938479238 could be stored in a file having filename /var/cache/entry-2938479238.dat).

As expressed above, any hashing algorithm may be used to produce the hash value. One example for calculating a hash value of a tile creation request is to sum the bytes that constitute the request in computer memory, modulo a certain number that is the largest hash value (e.g. $2^{1024}$ for a 1024 bit hash value).

It should be recognized that the cache 123 may be cleaned up according to a least-recently used policy. The cache may be on disk or in memory and has a constrained size. Another policy may be to remove the least frequently used object in a certain time window (e.g. least frequently used object in the past hour). Those of ordinary skill in the art should understand that other cache policies may be used without deviating from the scope of the invention.

Figure 2:
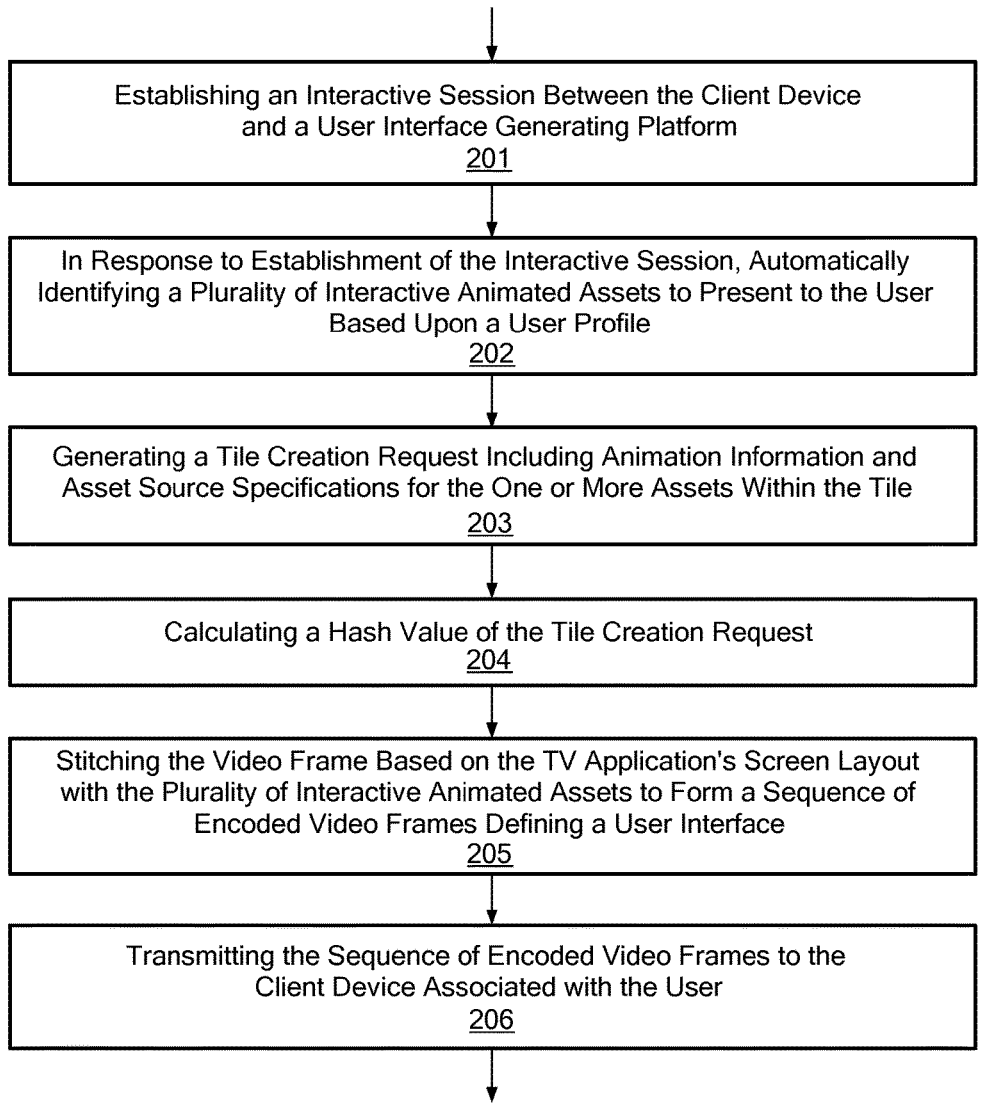
FIG. 2 is a flow chart of one embodiment of a method to create a real-time user interface.

FIG. 2 is a flow chart that outlines the server-side creation of a user interface in real-time. First, an interactive session is established between a client device and the user interface generating platform 201. The user interface generating platform may be located at a cable television head-end or another remote location from the client device wherein the client device and the user interface generating platform are in communication by one or more networks. The establishment of an interactive session may be as the result of user interactive with the client device or may be established automatically with the client device. In response to establishment of the interactive session, a plurality of interactive animated assets are selected for presentation to the user based in part upon the user's profile 202. The user's profile may contain historical information about past selection and may be populated either directly by the user (e.g. information entry in forms) or through indirect entry (e.g. tracking user's selections and activity). A recommendation engine may assist in the selection of the assets as described above. A tile creation request is then generated that includes animation information and asset source specification for the one or more assets within a tile 203. The tile creation request will identify objects including encoded and unencoded tiles and underlying assets. Additionally, associated layout information and any scripting can be provided in the tile creation request or determined by the tile factory. A hash value is determined for the tile creation request 204. The hash value is stored and is used for comparison with a hash databases or linked list that contains pre-encoded items within a cache that can be reused without the need for encoding or re-encoding. For example, the cache may contain a plurality of MPEG-encoded elements that can be re-used and provided to a stitcher or stitching application. A video frame is then stitched together based upon the one or more tiles, the scripting animation, and assets that are in the form of encoded fragments 205. If the assets or tiles to be presented are in an unencoded form or need to be re-encoded, the assets and tiles are encoded/transcoded into encoded fragments. The encoded fragments are assembled in the encoded domain to form a complete video frame for the user interface. Each video frame is then transmitted in real-time to the requesting client device for display on a display device 206. The system transmits a sequence of video frames to the client device forming an encoded video stream (e.g. an MPEG elementary stream). The encoded video stream is decoded by the client device and displayed as a user-interface on the display. As previously indicated, the user interface will include animations and action wherein tiles will automatically become active and then inactive without user intervention. User intervention can change the flow of a script, allowing a user to interact with one or more tiles and view assets (previews, posters, and programs).

Figure 3:
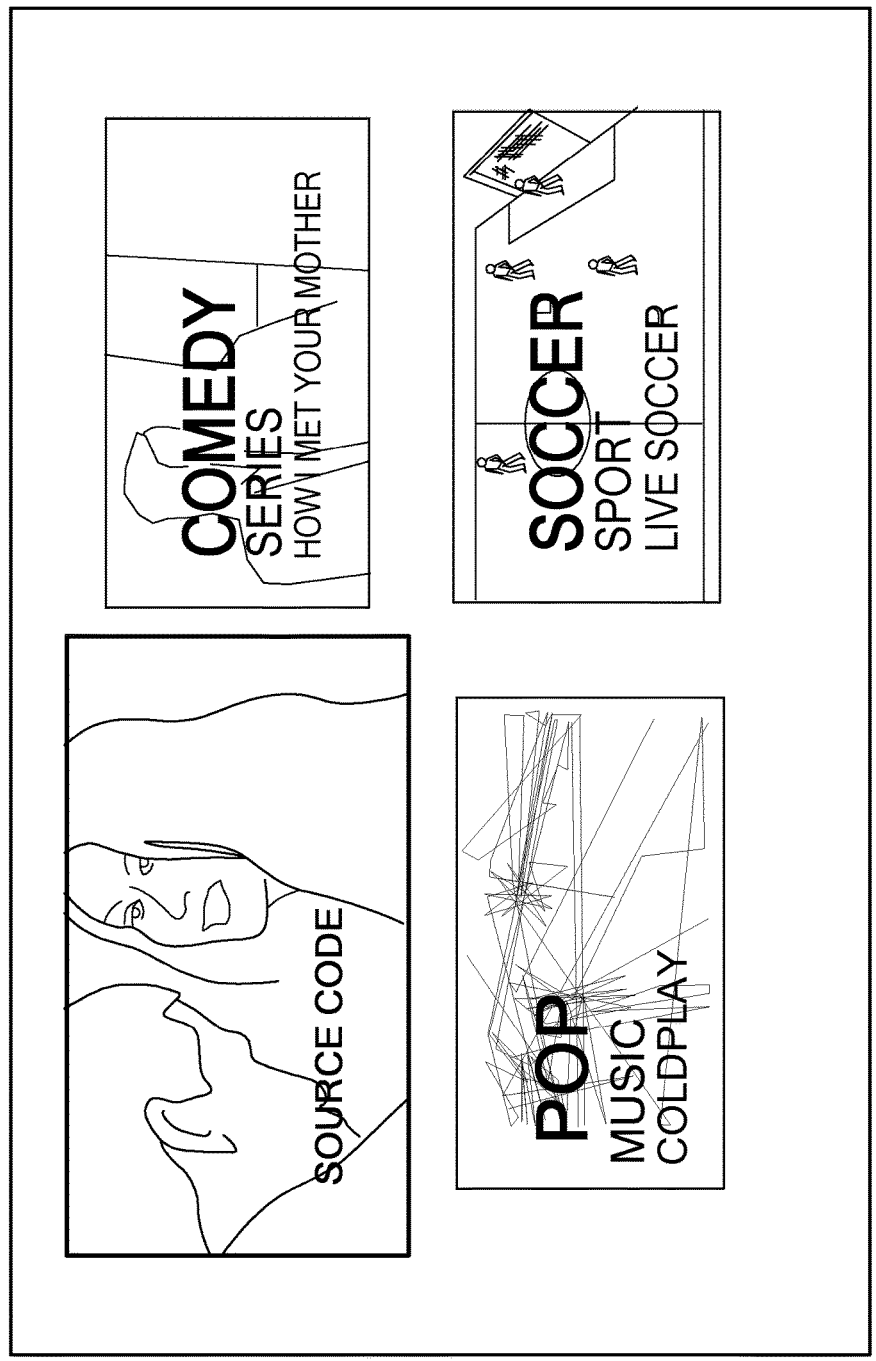
FIG. 3 is a first representative lean-back user interface.

FIG. 3 shows an example user interface. The upper-left tile is displaying a trailer (asset) of the movie (source content), while the other three (Comedy, Pop, and Voetbal (football)) assets are stills. After some time, the upper-left tile stops animating and a different tile becomes active: it starts to play trailers and previews of TV shows. The audio follows the active (highlighted) tile.

Figure 4:
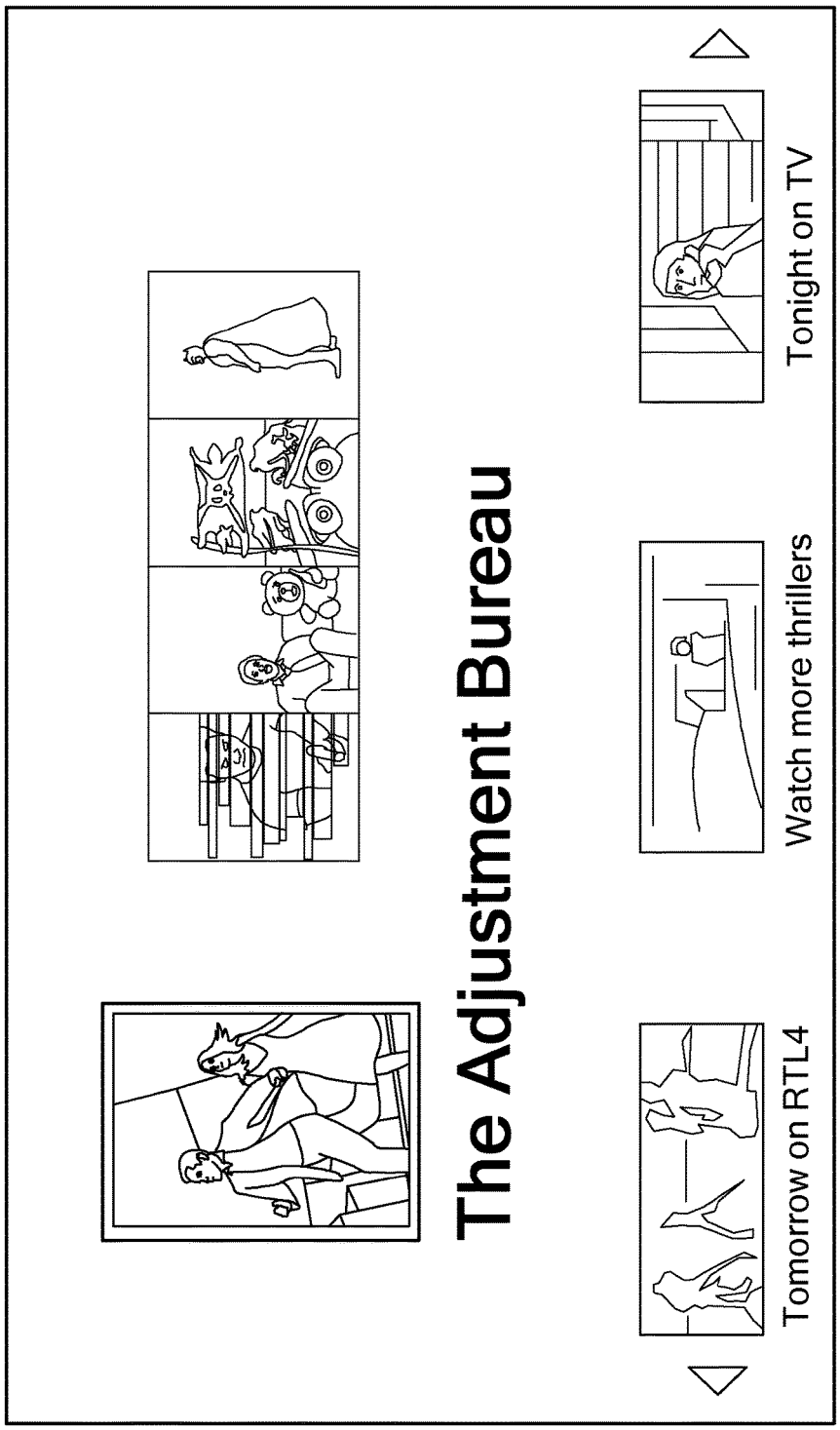
FIG. 4 is a second representative lean-back user interface.

FIG. 4 shows an alternative embodiment of the user interface. In this embodiment, the upper part of the screen displays a number of movie posters (ActiveTiles) where the leftmost tile is active. It is displayed with brighter colours than the non-active tiles, has a marker, and is enlarged. The trailer corresponding to the highlighted tile plays in the background. The trailer may not play until its end, depending on application settings the trailer may stop after a pre-set time and the next tile becomes active (i.e. its poster is highlighted, and its trailer starts playing). The lower part is a more traditional navigation bar, showing other categories ('tomorrow on RTL4', 'watch more thrillers', and 'tonight on TV').

The embodiments of the invention described above are intended to be merely exemplary; numerous variations and modifications will be apparent to those skilled in the art. All such variations and modifications are intended to be within the scope of the present invention as defined in any appended claims.

It should be recognized by one of ordinary skill in the art that the foregoing methodology may be performed in a video processing environment and the environment may include one or more processors for processing computer code representative of the foregoing described methodology. The computer code may be embodied on a tangible computer readable storage medium i.e. a computer program product. Additionally, the functions of the modules in FIG. 1 may be distributed among a plurality of processors either local or remote from one another.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an embodiment of the present invention, predominantly all of the reordering logic may be implemented as a set of computer program instructions that is converted into a computer executable form, stored as such in a computer readable medium, and executed by a microprocessor within the array under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.).

We claim:

1. A method for displaying interactive animated assets associated with entertainment content on a television coupled to a client device, the television associated with a user, the method comprising, at a server:
    establishing an interactive session between the client device and the server over a communications network;
    in response to establishment of the interactive session, automatically identifying a plurality of interactive animated assets to present to the user based upon a user profile, wherein one or more of the plurality of interactive animated assets are to be displayed within one or more tiles in a user interface;
    generating, for each of the one or more tiles, a tile creation request including a reference to a source of at least one interactive animated asset of the plurality of interactive animated assets to be displayed within the tile;
    forming a sequence of encoded video frames, wherein a respective video frame of the sequence of video frames is formed by stitching respective frames of the plurality of interactive animated assets based on the one or more tiles, wherein the sequence of encoded video frames defines the user interface; and
    transmitting the sequence of encoded video frames to the client device for display.

2. The method according to claim 1, further comprising:
    prior to forming the sequence of encoded video frames:
        calculating a hash value of the tile creation request;
        comparing the hash value of the tile creation request with entries of a hash value list, wherein each hash value in the hash value list is associated with a corresponding cached interactive animated asset; and
        if the hash value of the tile creation request is present in the hash value list:
            retrieving the cached interactive animated assets corresponding to the hash value of the tile creation request; and
            providing the corresponding cached interactive animated asset for stitching.

3. The method according to claim 2, further comprising, if the hash value of the tile creation request is not present in the hash value list, storing the hash value of the tile creation request and the at least one interactive animated asset of the plurality of interactive animated assets in cache storage.

4. The method according to claim 1, wherein a respective interactive animated asset of the plurality of interactive animated assets includes graphical components for each of a plurality of states.

5. The method according to claim 4, wherein:
    a first state of the plurality of states is an active state associated with a graphical component that is a full motion video, and
    a second state of the plurality of states is an inactive state associated with a graphical component that is a still image.

6. The method according to claim 1, further comprising:
    in accordance with scripting information, encoding or transcoding an interactive animated asset of the plurality of interactive animated assets.

7. The method according to claim 1, wherein the user profile includes historical data based on the user's previous actions.

8. The method according to claim 1, further comprising:
    in response to a user selection of a graphical component of a first interactive animated asset of the plurality of interactive animated assets:
        causing the first interactive animated asset to transition from inactive to active; and
        causing one or more other interactive animated assets of the plurality of interactive animated assets within the user interface to transition from active to inactive.

9. The method according to claim 1, wherein the communications network does not include a quality of service.

10. The method according to claim 9, wherein the method is performed substantially real-time.

11. The method according to claim 1, further comprising:
    causing a first interactive animated asset of the plurality of interactive animated assets to transition from an inactive state into an active state, including causing the first interactive animated asset to begin presentation of a full motion video sequence.

12. The method according to claim 11, further comprising:
    after a predetermined amount of time after causing the first interactive animated asset to transition from the inactive state to the active state:
        causing the first interactive animated asset to transition from the active state into the inactive state; and
        causing a second interactive animated asset to transition from an inactive state into the active state.

13. The method according to claim 12, wherein:
    causing the first interactive animated asset of the plurality of interactive animated assets to transition from the inactive state into the active state further includes causing an indicia of the activation to be displayed in association with the first interactive animated asset.

14. The method according to claim 12, wherein causing the first interactive animated asset of the plurality of interactive animated assets to transition from the inactive state to the active state further includes causing an audio track associated with the first interactive animated asset to be transmitted with the sequence of encoded video frames.

15. The method according to claim 5, wherein activation of an interactive animated asset of the plurality of interactive animated assets causes graphical portions of the user interface to be replaced with the full motion video.

16. The method according to claim 1, wherein an interactive animated asset of the plurality of interactive animated assets in an inactive state is represented by a still image sized to fit within a tile.

17. The method according to claim 1, further comprising:
upon receiving a signal indicating selection of an interactive animated asset of the plurality of interactive animated assets in an active state, accessing interactive functionality associated with the selected interactive animated asset, causing the sequence of encoded video frames to change.

18. A non-transitory computer-readable medium storing computer code, configured for execution by one or more processors of a server, for displaying interactive animated assets on a television coupled to a client device, the television associated with a user, the computer code comprising computer code for:
at the server:
establishing an interactive session between the client device and the server over a communications network;
in response to establishment of the interactive session, automatically identifying a plurality of interactive animated assets to present to the user based upon a user profile, wherein one or more of the plurality of interactive animated assets are to be displayed within one or more tiles in a user interface;
generating, for each of the one or more tiles, a tile creation request including a reference to a source of at least one interactive animated asset of the plurality of interactive animated assets to be displayed within the tile;
forming a sequence of encoded video frames, wherein a respective video frame of the sequence of video frames is formed by stitching respective frames of the plurality of interactive animated assets based on the one or more tiles, wherein the sequence of encoded video frames defines the user interface; and
transmitting the sequence of encoded video frames to the client device for display.

19. The computer-readable medium according to claim 18, further comprising computer code for:
prior to forming the sequence of encoded video frames:
calculating a hash value of the tile creation request;
comparing the hash value of the tile creation request with entries of a hash value list, wherein each hash value in the hash value list is associated with a corresponding cached interactive animated asset; and
if the hash value of the tile creation request is present in the hash value list:
retrieving the cached interactive animated assets corresponding to the hash value of the tile creation request; and
providing the corresponding cached interactive animated asset for stitching.

20. The computer-readable medium according to claim 19, further comprising computer code for:
if the hash value of the tile creation request is not present in the hash value list, storing the hash value of the tile creation request and the at least one interactive animated asset of the plurality of interactive animated assets in cache storage.

21. The computer-readable medium according to claim 18, wherein a respective interactive animated asset of the plurality of interactive animated assets includes graphical components for each of a plurality of states.

22. The computer-readable medium according to claim 21, wherein:
a first state of the plurality of states is an active state associated with a graphical component that is a full motion video, and
a second state of the plurality of states is an inactive state associated with a graphical component that is a still image.

23. The computer-readable medium according to claim 18, further comprising computer code for:
encoding or transcoding an interactive animated asset of the plurality of interactive animated assets in accordance with scripting information.

24. The computer-readable medium according to claim 18, wherein the user profile includes historical data based on the user's previous actions.

25. The computer-readable medium according to claim 18, further comprising computer code for:
causing a first interactive animated asset of the plurality of interactive animated assets to transition from an inactive state into an active state, including causing the first interactive animated asset to begin presentation of a full motion video sequence.

26. The computer-readable medium according to claim 25, further comprising computer code for:
after a predetermined amount of time after causing the first interactive animated asset to transition from the inactive state to the active state:
causing the first interactive animated asset to transition from the active state into the inactive state; and
causing a second interactive animated asset to transition from an inactive state into the active state.

27. The computer-readable medium according to claim 25, wherein:
causing the first interactive animated asset of the plurality of interactive animated assets to transition from the inactive state into the active state further includes causing an indicia of the activation to be displayed in association with the first interactive animated asset.

28. The computer-readable medium according to claim 25, wherein:
causing the first interactive animated asset to transition from the inactive state to the active state further includes causing an audio track associated with the first interactive animated asset to be transmitted with the sequence of encoded video frames.

29. The computer-readable medium according to claim 18, wherein an interactive animated asset of the plurality of interactive animated assets in an inactive state is represented by a still image sized to fit within a tile.

30. The computer-readable medium according to claim 18, further comprising computer code for:
upon receiving a signal indicating selection of an interactive animated asset of the plurality of interactive animated assets in an active state, accessing interactive functionality associated with the selected interactive animated asset, causing the sequence of encoded video frames to change.

\* \* \* \* \*